United States Patent
Li et al.

(10) Patent No.: US 12,323,608 B2
(45) Date of Patent: Jun. 3, 2025

(54) ON NEURAL NETWORK-BASED FILTERING FOR IMAGING/VIDEO CODING

(71) Applicant: Lemon Inc., Grand Cayman (KY)

(72) Inventors: Yue Li, San Diego, CA (US); Li Zhang, San Diego, CA (US); Kai Zhang, San Diego, CA (US)

(73) Assignee: Lemon Inc (KY)

( * ) Notice: Subject to any disclaimer, the term of this patent is extended or adjusted under 35 U.S.C. 154(b) by 53 days.

(21) Appl. No.: 17/714,027

(22) Filed: Apr. 5, 2022

(65) Prior Publication Data

US 2022/0337853 A1 Oct. 20, 2022

Related U.S. Application Data

(60) Provisional application No. 63/171,743, filed on Apr. 7, 2021.

(51) Int. Cl.
| | |
|---|---|
| *H04N 19/00* | (2014.01) |
| *H04N 19/117* | (2014.01) |
| *H04N 19/124* | (2014.01) |
| *H04N 19/132* | (2014.01) |
| *H04N 19/136* | (2014.01) |
| *H04N 19/146* | (2014.01) |
| *H04N 19/169* | (2014.01) |
| *H04N 19/31* | (2014.01) |
| *H04N 19/436* | (2014.01) |

(Continued)

(52) U.S. Cl.
CPC ......... *H04N 19/436* (2014.11); *H04N 19/117* (2014.11); *H04N 19/124* (2014.11); *H04N 19/132* (2014.11); *H04N 19/136* (2014.11); *H04N 19/146* (2014.11); *H04N 19/1883* (2014.11); *H04N 19/31* (2014.11); *H04N 19/70* (2014.11); *H04N 19/82* (2014.11)

(58) Field of Classification Search
CPC .. H04N 19/436; H04N 19/117; H04N 19/124; H04N 19/132; H04N 19/136; H04N 19/146; H04N 19/1883; H04N 19/31; H04N 19/70; H04N 19/82
See application file for complete search history.

(56) References Cited

U.S. PATENT DOCUMENTS

| | | | |
|---|---|---|---|
| 2018/0249158 A1* | 8/2018 | Huang | G06T 5/001 |
| 2020/0244997 A1* | 7/2020 | Galpin | G06N 3/084 |
| 2020/0304836 A1* | 9/2020 | Li | H04N 19/85 |

(Continued)

OTHER PUBLICATIONS

Li et al. "AHG11: Convolutional Neural Network-based In-Loop Filter with Adaptive Model Selection". Jan. 5, 2021. (Year: 2021).*

(Continued)

*Primary Examiner* — Zhihan Zhou
(74) *Attorney, Agent, or Firm* — Conley Rose, P.C.

(57) ABSTRACT

A method of processing video data. The method includes selecting an in-loop filter from a plurality of neural network (NN) filter model candidates, wherein the plurality of NN filter model candidates are based on a reconstructed quality level of a video unit, and performing a conversion between a video media file comprising the video unit and a bitstream based on the in-loop filter selected. A corresponding video coding apparatus and non-transitory computer readable medium are also disclosed.

17 Claims, 21 Drawing Sheets

(51) Int. Cl.
*H04N 19/70* (2014.01)
*H04N 19/82* (2014.01)

(56) References Cited

U.S. PATENT DOCUMENTS

| | | | |
|---|---|---|---|
| 2022/0103864 A1* | 3/2022 | Wang | H04N 19/176 |
| 2022/0217403 A1* | 7/2022 | Choi | H04N 19/593 |
| 2022/0256227 A1* | 8/2022 | Rezazadegan Tavakoli | H04N 19/70 |
| 2022/0295116 A1* | 9/2022 | Ma | H04N 19/117 |
| 2022/0321919 A1* | 10/2022 | Deshpande | H04N 19/70 |
| 2022/0337857 A1* | 10/2022 | Choi | H04N 19/46 |
| 2023/0328293 A1* | 10/2023 | Chen | G06N 3/045 375/240.29 |
| 2023/0345003 A1* | 10/2023 | Chen | H04N 19/124 |

OTHER PUBLICATIONS

Bross, B., et al., "Versatile Video Coding (Draft 10)," http://phenix.it-sudparis.eu/jvet/doc_end_user/current_document.php?id=10399, Jul. 15, 2022, 1 page.

Suehring, K., https://vcgit.hhi.fraunhofer.de/jvet/VVCSoftware_VTM/-/tags/VTM-10.0, Jul. 15, 2022, 2 pages.

Document: JVET-L0147, Lim, S-C., et al., "CE2: Subsampled Laplacian calculation (Test 6.1, 6.2, 6.3, and 6.4), " Joint Video Experts Team (JVET) of ITU-T SG 16 WP 3 and ISO/IEC JTC 1/SC 29/WG 11 12th Meeting: Macao, CN, Oct. 3-12, 2018, 8 pages.

Document: JVET-N0242, Taquet, J., et al., "E5: Results of tests CE5-3.1 to CE5-3.4 on Non-Linear Adaptive Loop Filter," Joint Video Experts Team (JVET) of ITU-T SG 16 WP 3 and ISO/IEC JTC 1/SC 29/WG 11 14th Meeting: Geneva, CH, Mar. 19-27, 2019, 10 pages.

Balle, J., et al., "End-to-end optimization of nonlinear transform codes for perceptual quality," In PCS. IEEE, 2016, 5 pages.

Theis, L., et al., "Lossy image compression with compressive autoencoders," Published as a conference paper at ICLR, arXiv preprint arXiv:1703.00395, Mar. 1, 2017, 19 pages.

Li, J., et al., "Fully Connected Network-Based Intra Prediction for Image Coding," IEEE Transactions on Image Processing 27, 2018, pp. 3236-3247.

Dai, Y., "A Convolutional Neural Network Approach for Post-Processing in HEVC Intra Coding," arXiv:1608.06690v2, [cs.MM] Oct. 29, 2016, 12 pages.

Song, R., et al., "Neural Network-Based Arithmetic Coding of Intra Prediction Modes in HEVC," In VCIP, IEEE, 2017, 4 pages.

Pfaff, J., et al., "Neural network based intra prediction for video coding," In Applications of Digital Image Processing KLI, vol. 10752, International Society for Optics and Photonics, 1075213, Sep. 17, 2018, 7 pages.

* cited by examiner

700

| $p3_0$ | $p2_0$ | $p1_0$ | $p0_0$ | $q0_0$ | $q1_0$ | $q2_0$ | $q3_0$ |
| --- | --- | --- | --- | --- | --- | --- | --- |
| $p3_1$ | $p2_1$ | $p1_1$ | $p0_1$ | $q0_1$ | $q1_1$ | $q2_1$ | $q3_1$ |
| $p3_2$ | $p2_2$ | $p1_2$ | $p0_2$ | $q0_2$ | $q1_2$ | $q2_2$ | $q3_2$ |
| $p3_3$ | $p2_3$ | $p1_3$ | $p0_3$ | $q0_3$ | $q1_3$ | $q2_3$ | $q3_3$ |
| $p3_4$ | $p2_4$ | $p1_4$ | $p0_4$ | $q0_4$ | $q1_4$ | $q2_4$ | $q3_4$ |
| $p3_5$ | $p2_5$ | $p1_5$ | $p0_5$ | $q0_5$ | $q1_5$ | $q2_5$ | $q3_5$ |
| $p3_6$ | $p2_6$ | $p1_6$ | $p0_6$ | $q0_6$ | $q1_6$ | $q2_6$ | $q3_6$ |
| $p3_7$ | $p2_7$ | $p1_7$ | $p0_7$ | $q0_7$ | $q1_7$ | $q2_7$ | $q3_7$ | first 4 lines second 4 lines

FIG. 7

Residual block

ON NEURAL NETWORK-BASED FILTERING FOR IMAGING/VIDEO CODING

CROSS-REFERENCE TO RELATED APPLICATIONS

This patent application claims the benefit of U.S. Provisional Patent Application No. 63/171,743 filed Apr. 7, 2021, by Lemon, Inc., and titled "On Neural Network-Based Filtering for Image/Video Coding," which is hereby incorporated by reference.

TECHNICAL FIELD

The present disclosure is generally related to video coding and, in particular, to the in-loop filter in image/video coding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed aspects/embodiments provide one or more neural network (NN) filter models trained as part of an in-loop filtering operation or filtering technology used in a post-processing stage for reducing the distortion incurred during compression. In addition, an in-loop filter comprising one or more of the NN filter models may be selected based on a reconstructed quality level of a video unit. Further, a rule or other syntax element identifying the in-loop filter may be included in a bitstream, including a supplemental enhancement information (SEI) message of the bitstream.

A first aspect relates to a method of processing video data. The method includes selecting an in-loop filter from a plurality of neural network (NN) filter model candidates, wherein the plurality of NN filter model candidates are based on a reconstructed quality level of a video unit, and performing a conversion between a video media file comprising the video unit and a bitstream based on the in-loop filter selected.

Optionally, in any of the preceding aspects, another implementation of the aspect provides that the one or more NN filter model candidates comprise one or more pretrained convolutional neural network (CNN) filter models.

Optionally, in any of the preceding aspects, another implementation of the aspect provides that each of the plurality of NN filter model candidates corresponds to a different reconstructed quality level of video unit.

Optionally, in any of the preceding aspects, another implementation of the aspect provides that the reconstructed quality level of the video unit corresponds to a quantization parameter (QP) of the video unit or at least one of a constant rate factor and a bitrate of the video unit.

Optionally, in any of the preceding aspects, another implementation of the aspect provides that the in-loop filter selected is one of a plurality of in-loop filters including a second in-loop filter, and wherein application of the second in-loop filter is dependent on whether or how the in-loop filter selection is applied, and the plurality of in-loop filters comprise at least one of a deblocking filter, a sample adaptive offset (SAO) filter, an adaptive loop filter (ALF), a cross-component adaptive loop filter (CCALF), and a bilateral filter.

Optionally, in any of the preceding aspects, another implementation of the aspect provides that syntax elements corresponding to the in-loop filter selected are coded in the bitstream before syntax elements corresponding to an adaptive loop filter (ALF).

Optionally, in any of the preceding aspects, another implementation of the aspect provides that syntax elements corresponding to the in-loop filter selected are coded in the bitstream at a coding tree unit (CTU) level before syntax elements corresponding to an adaptive loop filter (ALF) or before syntax elements corresponding to a sample adaptive offset (SAO) filter.

Optionally, in any of the preceding aspects, another implementation of the aspect provides that the in-loop filter selected is coded in a supplemental enhancement information (SEI) message of the bitstream.

Optionally, in any of the preceding aspects, another implementation of the aspect provides determining that a same index in a bitstream is associated with different neural network (NN) filters for two video units.

Optionally, in any of the preceding aspects, another implementation of the aspect provides that the same index is disposed in a supplemental enhancement information (SEI) message in the bitstream.

Optionally, in any of the preceding aspects, another implementation of the aspect provides determining whether a group of NN filter model candidates are the same or different for video units across different temporal layers.

Optionally, in any of the preceding aspects, another implementation of the aspect provides that the determination of whether the group of NN filter model candidates are the same or different for video units across different temporal layers is specified in a rule included in a supplemental enhancement information (SEI) message of the bitstream.

Optionally, in any of the preceding aspects, another implementation of the aspect provides that a rule included in the bitstream specifies that a first subgroup of the group NN filter model candidates is to be used in an in-loop filtering operation across a first subgroup of the different temporal layers, and that a second subgroup of the group of NN filter model candidates is to be used in an in-loop filtering operation across a second subgroup of the different temporal layers.

Optionally, in any of the preceding aspects, another implementation of the aspect provides that the first subgroup of the different temporal layers comprises layers which have a temporal index of no greater than K1, and wherein at least one of the group of NN filter model candidates to be used in the in-loop filtering operation across the first subgroup is specified by a rule included in the bitstream based on a number of intra coded samples of the first subgroup.

Optionally, in any of the preceding aspects, another implementation of the aspect provides that a rule included in the bitstream associates the group of NN filter model candidates with both a first temporal layer and a separate second temporal layer of the different temporal layers.

Optionally, in any of the preceding aspects, another implementation of the aspect provides that a rule included in the bitstream associates the group of NN filter model candidates with a specific temporal layer of the different temporal layers.

Optionally, in any of the preceding aspects, another implementation of the aspect provides that the conversion comprises encoding the video media file into the bitstream.

Optionally, in any of the preceding aspects, another implementation of the aspect provides that the conversion includes decoding the video media file from the bitstream.

A second aspect relates to an apparatus for coding video data comprising a processor and a non-transitory memory with instructions thereon. The instructions upon execution by the processor cause the processor to select an in-loop filter from a plurality of neural network (NN) filter model candidates, wherein the plurality of NN filter model candidates are based on a reconstructed quality level of a video unit, and convert between a video media file comprising the video unit and a bitstream based on the in-loop filter selected.

A third aspect relates to a non-transitory computer-readable recording medium storing a bitstream of a video which is generated by a method performed by a video processing apparatus. In an embodiment, the method comprises selecting an in-loop filter from a plurality of neural network (NN) filter model candidates, wherein the plurality of NN filter model candidates are based on a reconstructed quality level of a video unit, and performing a conversion between a video media file comprising the video unit and a bitstream based on the in-loop filter selected.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 is an example of pixels involved in filter on/off decision and strong/weak filter selection.

DETAILED DESCRIPTION

Figure 1:
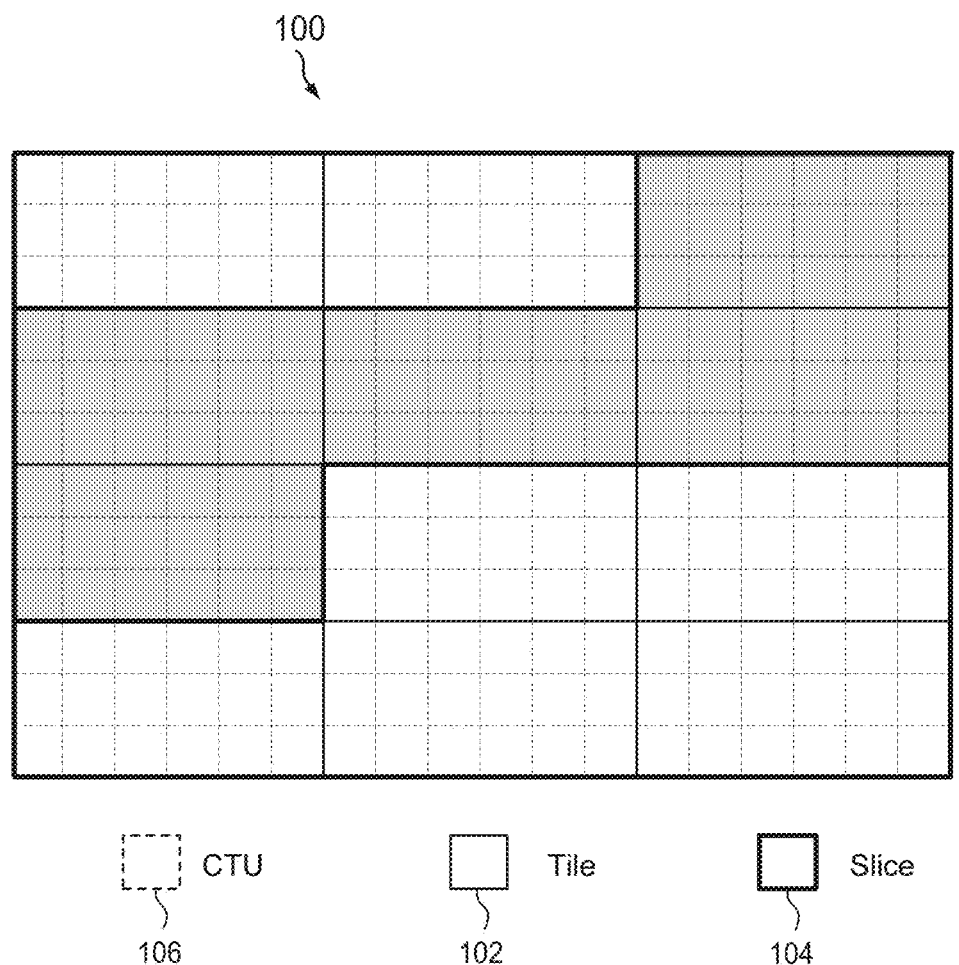
FIG. 1 is an example of raster-scan slice partitioning of a picture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

H.266 terminology is used in some description only for ease of understanding and not for limiting scope of the disclosed techniques. As such, the techniques described herein are applicable to other video codec protocols and designs also.

Video coding standards have evolved primarily through the development of the well-known International Telecommunication Union-Telecommunication (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards.

Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM).

In April 2018, the Joint Video Expert Team (JVET) between VCEG (Q6/16) and ISO/IEC JTC1 SC29/WG11 (MPEG) was created to work on the Versatile Video Coding (VVC) standard targeting a fifty percent (50%) bitrate reduction compared to HEVC. VVC version 1 was finalized in July 2020.

Color space and chroma subsampling are discussed. Color space, also known as the color model (or color system), is an abstract mathematical model which simply describes the range of colors as tuples of numbers, typically as 3 or 4 values or color components (e.g., red green blue (RGB)). Basically speaking, color space is an elaboration of the coordinate system and sub-space.

For video compression, the most frequently used color spaces are YCbCr and RGB. Y'CbCr, or Y Pb/Cb Pr/Cr, also written as $YC_BC_R$ or $Y'C_{BR}$, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

For 4:4:4: chroma subsampling, each of the three Y'CbCr components have the same sample rate, thus there is no chroma subsampling. This scheme is sometimes used in high-end film scanners and cinematic post production.

For 4:2:2 chroma subsampling, the two chroma components are sampled at half the sample rate of luma: the horizontal chroma resolution is halved. This reduces the bandwidth of an uncompressed video signal by one-third with little to no visual difference.

For 4:2:0 chroma subsampling, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of two both horizontally and vertically. There are three variants of 4:2:0 schemes, having different horizontal and vertical siting.

In MPEG-2, Cb and Cr are co-sited horizontally. Cb and Cr are sited between pixels in the vertical direction (sited interstitially). In Joint Photographic Experts Group (JPEG)/JPEG File Interchange Format (JFIF), H.261, and MPEG-1, Cb and Cr are sited interstitially, halfway between alternate luma samples. In 4:2:0 DV, Cb and Cr are co-sited in the horizontal direction. In the vertical direction, they are co-sited on alternating lines.

Definitions of video units are provided. A picture is divided into one or more tile rows and one or more tile columns. A tile is a sequence of coding tree units (CTUs) that covers a rectangular region of a picture. A tile is divided into one or more bricks, each of which consists of a number of CTU rows within the tile. A tile that is not partitioned into multiple bricks is also referred to as a brick. However, a brick that is a true subset of a tile is not referred to as a tile. A slice either contains a number of tiles of a picture or a number of bricks of a tile.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

FIG. 1 is an example of raster-scan slice partitioning of a picture 100, where the picture is divided into twelve tiles 102 and three raster-scan slices 104. As shown, each of the tiles 102 and slices 104 contains a number of CTUs 106.

Figure 2:
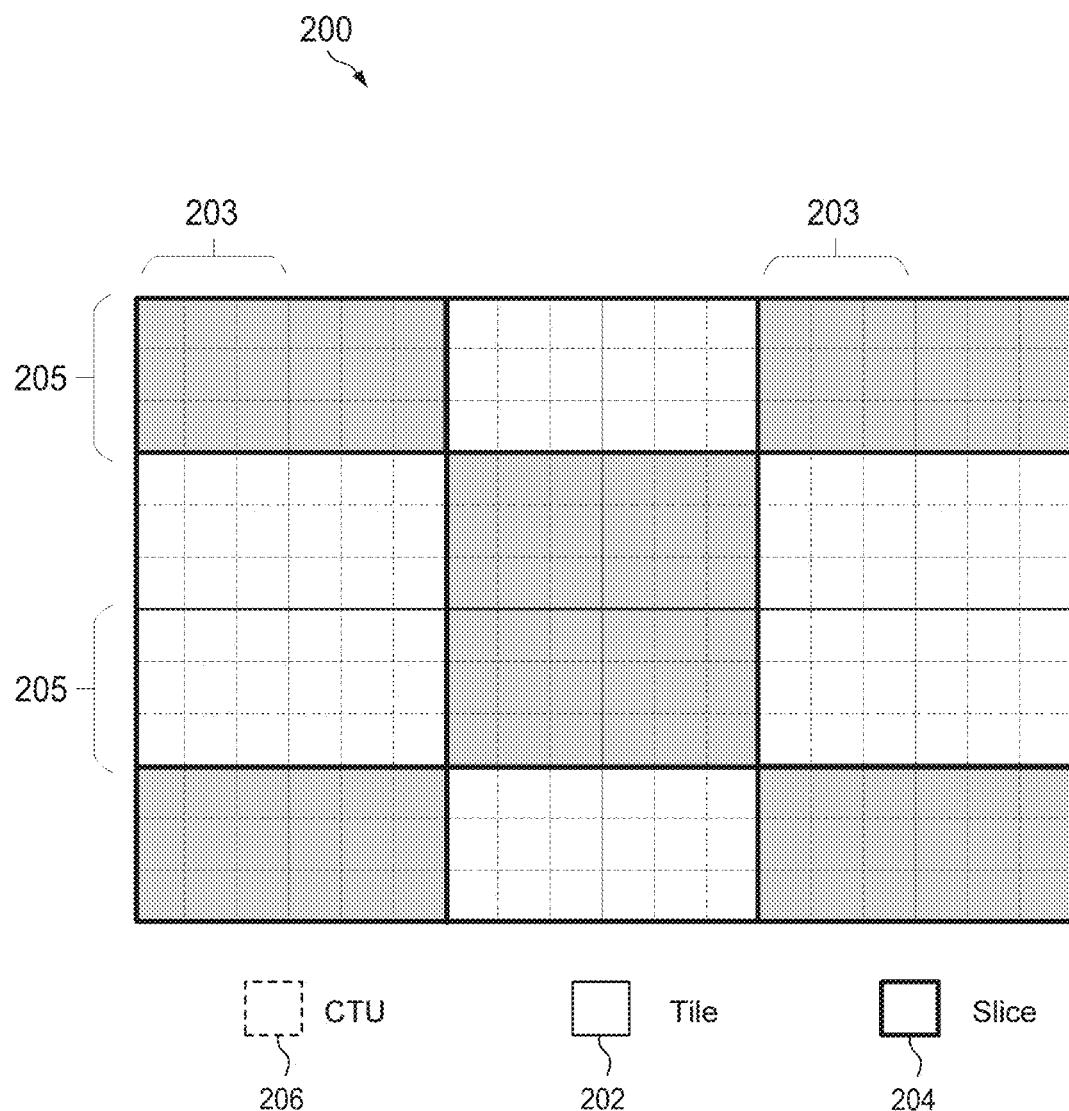
FIG. 2 is an example of rectangular slice partitioning of a picture.

FIG. 2 is an example of rectangular slice partitioning of a picture 200 according to the VVC specification, where the picture is divided into twenty-four tiles 202 (six tile columns 203 and four tile rows 205) and nine rectangular slices 204. As shown, each of the tiles 202 and slices 204 contains a number of CTUs 206.

Figure 3:
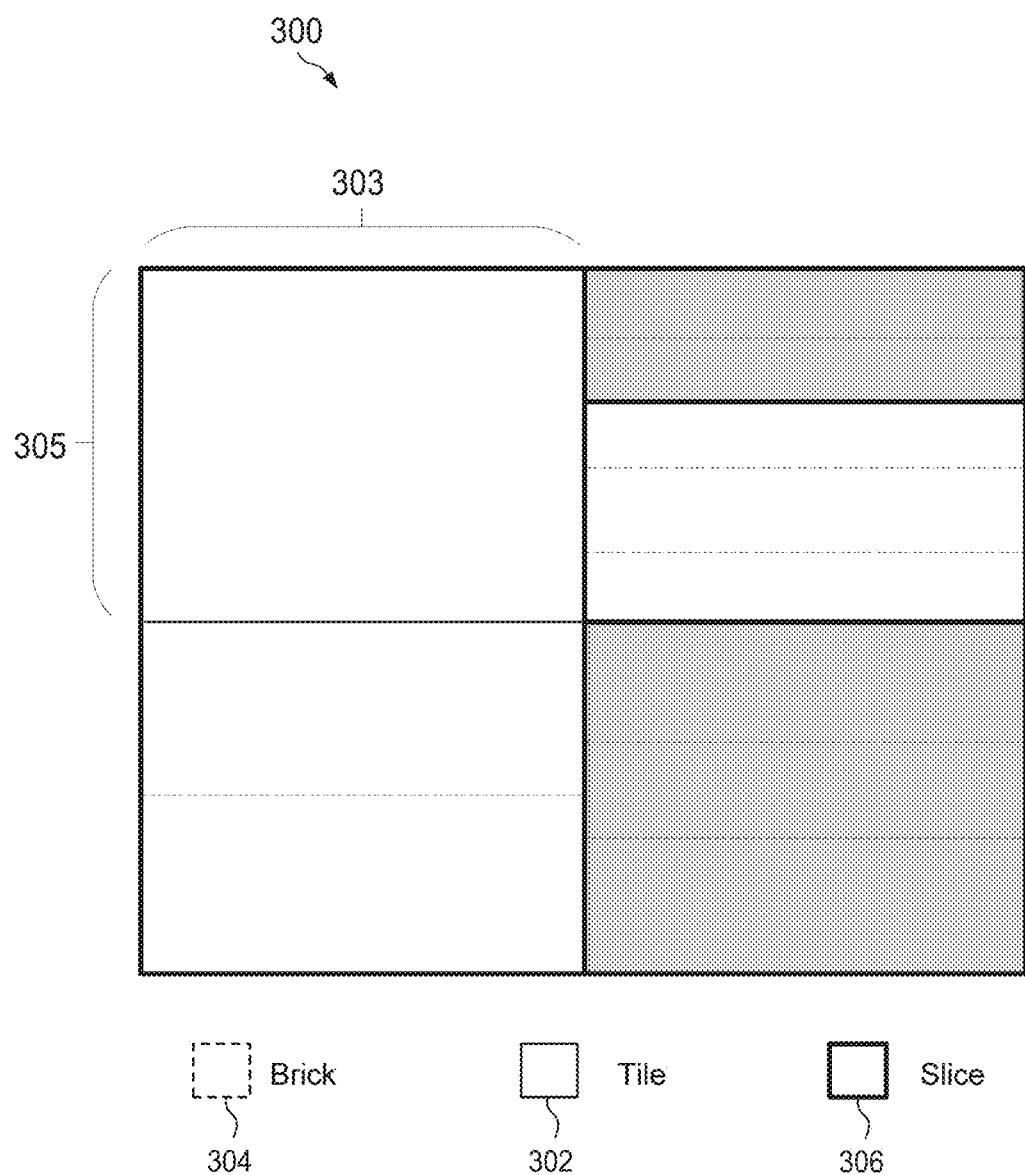
FIG. 3 is an example of a picture partitioned into tiles, bricks, and rectangular slices.

FIG. 3 is an example of a picture 300 partitioned into tiles, bricks, and rectangular slices according to the VVC specification, where the picture is divided into four tiles 302 (two tile columns 303 and two tile rows 305), eleven bricks 304 (the top-left tile contains one brick, the top-right tile contains five bricks, the bottom-left tile contains two bricks, and the bottom-right tile contain three bricks), and four rectangular slices 306.

CTU and coding tree block (CTB) sizes are discussed. In VVC, the coding tree unit (CTU) size, which is signaled in a sequence parameter set (SPS) by the syntax element log 2_ctu_size_minus2, could be as small as 4×4. The sequence parameter set raw byte sequence payload (RBSP) syntax is below.

|  | Descriptor |
|---|---|
| seq_parameter_set_rbsp( ) { |  |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sublayers_minus1 ) |  |
|   gra_enabled_flag | u(1) |
|   sps_seq_parameter_set_id | ue(v) |
|   chroma_format_idc | ue(v) |
|   if( chroma_format_idc = = 3 ) |  |
|     separate_colour_plane_flag | u(1) |
|   pic_width_in_luma_samples | ue(v) |
|   pic_height_in_luma_samples | ue(v) |
|   conformance_window_flag | u(1) |
|   if( conformance_window_flag ) { |  |
|     conf_win_left_offset | ue(v) |
|     conf_win_right_offset | ue(v) |
|     conf_win_top_offset | ue(v) |
|     conf_win_bottom_offset | ue(v) |
|   } |  |
|   bit_depth_luma_minus8 | ue(v) |
|   bit_depth_chroma_minus8 | ue(v) |
|   log2_max_pic_order_cnt_lsb_minus4 | ue(v) |
|   sps_sub_layer_ordering_info_present_flag | u(1) |
|   for( i = ( sps_sub_layer_ordering_info_present_flag ? 0: sps_max_sub_layers_minus1 ); |  |
|     i <= sps_max_sub_layers_minus1; i++ ) { |  |

-continued

|  | Descriptor |
|---|---|
|   sps_max_dec_pic_buffering_minus1[ i ] | ue(v) |
|   sps_max_num_reorder_pics[ ii ] | ue(v) |
|   sps_max_latency_increase_plus1[ i ] | ue(v) |
| } |  |
| long_term_ref_pics_flag | u(1) |
| sps_idr_rpl_present_flag | u(1) |
| rpl1_same_as_rpl0_flag | u(1) |
| for( i = 0; i < !rpl1_same_as_rpl0_flag ? 2: 1; i++ ) { |  |
|   num_ref_pic_lists_in_sps[ i ] | ue(v) |
|   for( j = 0; j < num_ref_pic_lists_in_sps[ i]; j++) |  |
|     ref_pic_list_struct( i, j ) |  |
| } |  |
| qtbtt_dual_tree_intra_flag | u(1) |
| log2_ctu_size_minus2 | ue(v) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { |  |
|   sps_log2_diff_max_bt_min_qt_intra_slice_luma | ue(v) |
|   sps_log2_diff_max_tt_min_qt_intra_slice_luma | ue(v) |
| } |  |
| if( sps_max_mtt_hierarchy_depth_inter_slices != 0 ) { |  |
|   sps_log2_diff_max_bt_min_qt_inter_slice | ue(v) |
|   sps_log2_diff_max_tt_min_qt_inter_slice | ue(v) |
| } |  |
| if( qtbtt_dual_tree_intra_flag ) { |  |
|   sps_log2_diff_min_qt_min_cb_intra_slice_chroma | ue(v) |
|   sps_max_mtt_hierarchy_depth_intra_slice_chroma | ue(v) |
|   if ( sps_max_mtt_hierarchy_depth_intra_slice_chroma != 0 ) |  |
|     sps_log2_diffmax_bt_min_qt_intra_slice_chroma | ue(v) |
|     sps_log2_diffmax_tt_min_qt_intra_slice_chroma | ue(v) |
|   } |  |
| } |  |
| ... |  |
|   rbsp_trailing_bits( ) |  |
| } |  | log 2_ctu_sizeminus2 plus 2 specifies the luma coding tree block size of each CTU.

log 2_min_luma_coding_block_size_minus2 plus 2 specifies the minimum luma coding block size.

The variables Ctb Log 2SizeY, CtbSizeY, MinCb Log 2SizeY, MinCbSizeY, MinTb Log 2SizeY, MaxTb Log 2SizeY, MinTbSizeY, MaxTbSizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightIInSamplesC are derived as follows.

$$\text{Ctb Log 2SizeY} = \log 2\_ctu\_size\_minus2+2 \qquad (7\text{-}9)$$

$$\text{CtbSizeY} = 1 << \text{Ctb Log 2SizeY} \qquad (7\text{-}10)$$

$$\text{MinCb Log 2SizeY} = \log 2\_min\_luma\_coding\_block\_size\_minus2+2 \qquad (7\text{-}11)$$

$$\text{MinCbSizeY} = 1 << \text{MinCb Log 2SizeY} \qquad (7\text{-}12)$$

$$\text{MinTb Log 2SizeY} = 2 \qquad (7\text{-}13)$$

$$\text{MaxTb Log 2SizeY} = 6 \qquad (7\text{-}14)$$

$$\text{MinTbSizeY} = 1 << \text{MinTb Log 2SizeY} \qquad (7\text{-}15)$$

$$\text{MaxTbSizeY} = 1 << \text{MaxTb Log 2SizeY} \qquad (7\text{-}16)$$

$$\text{PicWidthInCtbsY} = \text{Ceil}(pic\_width\_in\_luma\_samples \div \text{CtbSizeY}) \qquad (7\text{-}17)$$

$$\text{PicHeightInCtbsY} = \text{Ceil}(pic\_height\_in\_luma\_samples \div \text{CtbSizeY}) \qquad (7\text{-}18)$$

$$\text{PicSizeInCtbsY} = \text{PicWidthInCtbsY} * \text{PicHeightInCtbsY} \qquad (7\text{-}19)$$

$$\text{PicWidthInMinCbsY} = pic\_width\_in\_luma\_samples / \text{MinCbSizeY} \qquad (7\text{-}20)$$

$$\text{PicHeightInMinCbsY} = pic\_height\_in\_luma\_samples / \text{MinCbSizeY} \qquad (7\text{-}21)$$

$$\text{PicSizeInMinCbsY} = \text{PicWidthInMinCbsY} * \text{PicHeightInMinCbsY} \qquad (7\text{-}22)$$

$$\text{PicSizeInSamplesY} = pic\_width\_in\_luma\_samples * pic\_height\_in\_luma\_samples \qquad (7\text{-}23)$$

$$\text{PicWidthInSamplesC} = pic\_width\_in\_luma\_samples / \text{SubWidthC} \qquad (7\text{-}24)$$

$$\text{PicHeightInSamplesC} = pic\_height\_in\_luma\_samples / \text{SubHeightC} \qquad (7\text{-}25)$$

Figure 4A:
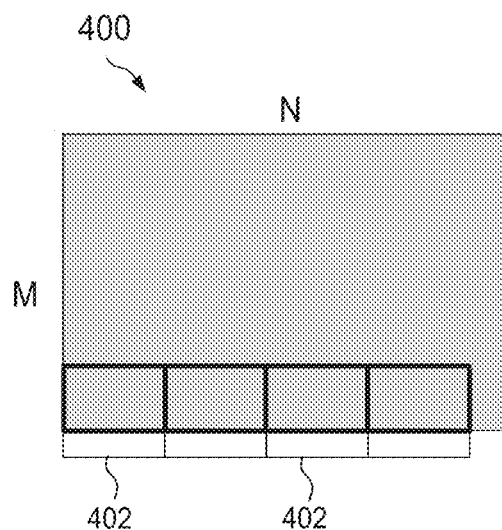
FIG. 4A is an example of coding tree blocks (CTBs) crossing the bottom picture border.
Figure 4B:
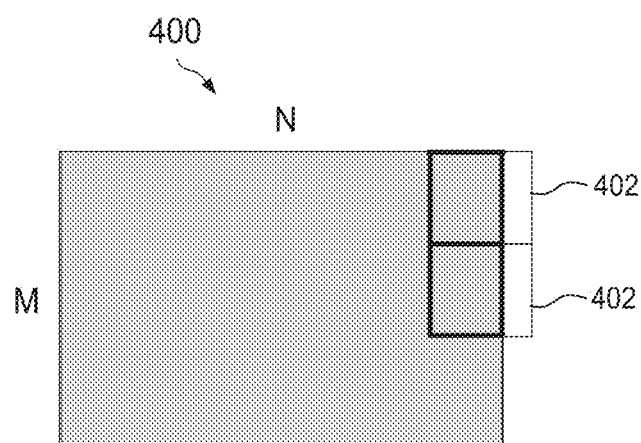
FIG. 4B is an example of CTBs crossing the right picture border.
Figure 4C:
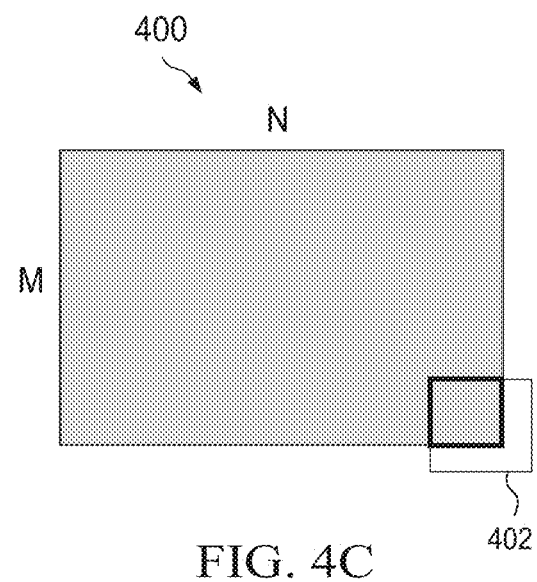
FIG. 4C is an example of CTBs crossing the right bottom picture border.

FIG. 4A is an example of CTBs crossing the bottom picture border. FIG. 4B is an example of CTBs crossing the right picture border. FIG. 4C is an example of CTBs crossing the right bottom picture border. In FIGS. 4A-4C, K=M, L<N; K<M, L=N; K<M, L<N, respectively.

CTUs in a picture 400 are discussed with reference to FIGS. 4A-4C. Suppose the CTB/largest coding unit (LCU) size is indicated by M×N (typically M is equal to N, as defined in HEVC/VVC), and for a CTB located at the picture (or tile or slice or other kinds of types, picture border is taken as an example) border, and K×L samples are within the picture border wherein either K<M or L<N. For those CTBs 402 as depicted in FIG. 4A-4C, the CTB size is still equal to M×N, however, the bottom boundary/right boundary of the CTB is outside the picture 400.

Figure 5:
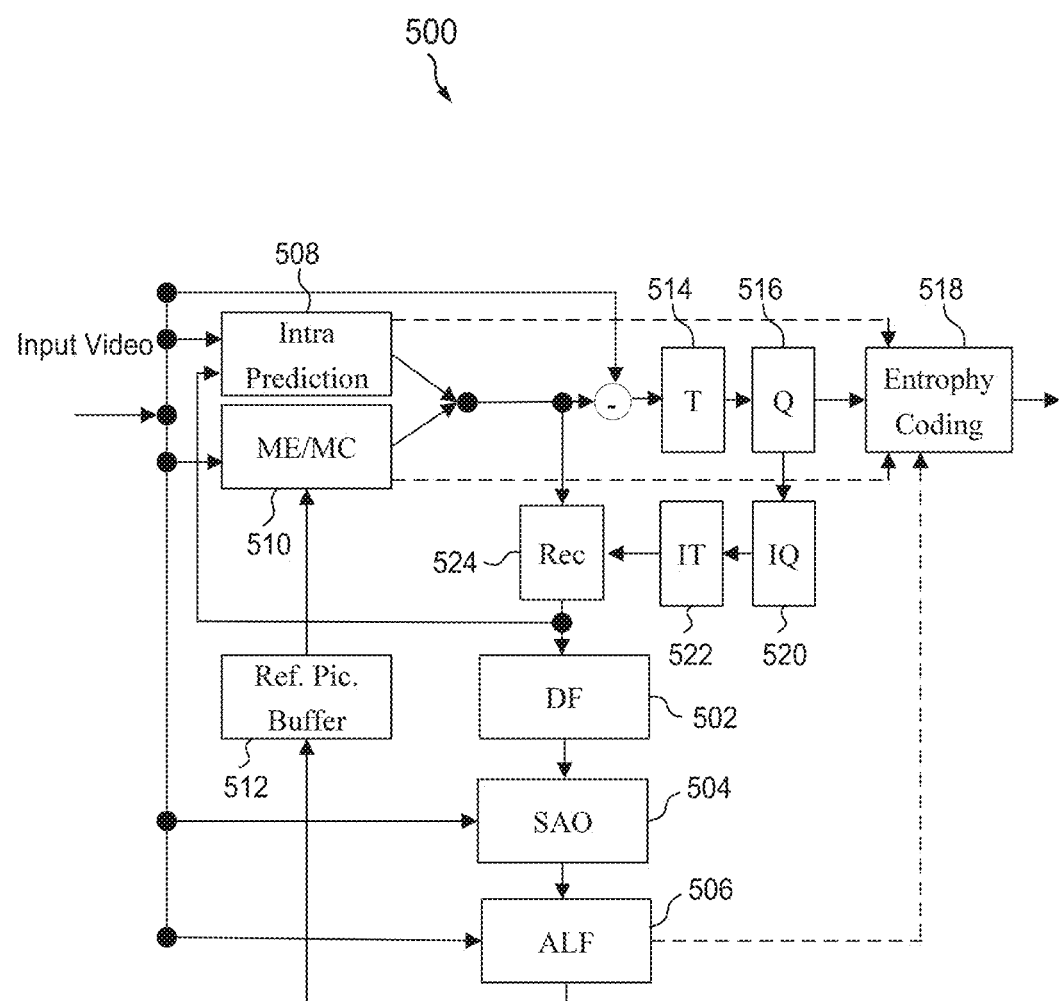
FIG. 5 is an example of an encoder.

The coding flow of a typical video coder/decoder (a.k.a., codec) is discussed. FIG. 5 is an example of an encoder block diagram of VVC, which contains three in-loop filtering blocks: deblocking filter (DF), sample adaptive offset (SAO) and adaptive loop filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

FIG. 5 is a schematic diagram of an encoder 500. The encoder 500 is suitable for implementing the techniques of VVC. The encoder 500 includes three in-loop filters, namely a deblocking filter (DF) 502, a sample adaptive offset (SAO) filter 504, and an ALF 506. Unlike the DF 502, which uses predefined filters, the SAO filter 504 and the ALF 506 utilize the original samples of the current picture to reduce the mean square errors between the original samples and the reconstructed samples by adding an offset and by applying a FIR filter, respectively, with coded side information signaling the offsets and filter coefficients. The ALF 506 is located at the last processing stage of each picture and can be regarded as a tool trying to catch and fix artifacts created by the previous stages.

The encoder 500 further includes an intra prediction component 508 and a motion estimation/compensation (ME/MC) component 510 configured to receive input video. The intra prediction component 508 is configured to perform intra prediction, while the ME/MC component 510 is configured to utilize reference pictures obtained from a reference picture buffer 512 to perform inter prediction. Residual blocks from inter prediction or intra prediction are fed into a transform component 514 and a quantization component 516 to generate quantized residual transform coefficients, which are fed into an entropy coding component 518. The entropy coding component 518 entropy codes the prediction results and the quantized transform coefficients and transmits the same toward a video decoder (not shown). Quantization components output from the quantization component 516 may be fed into an inverse quantization component 520, an inverse transform component 522, and a reconstruction (REC) component 524. The REC component 524 is able to output images to the DF 502, the SAO filter 504, and the ALF 506 for filtering prior to those images being stored in the reference picture buffer 512.

The input of the DF 502 is the reconstructed samples before in-loop filters. The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

Figure 6:
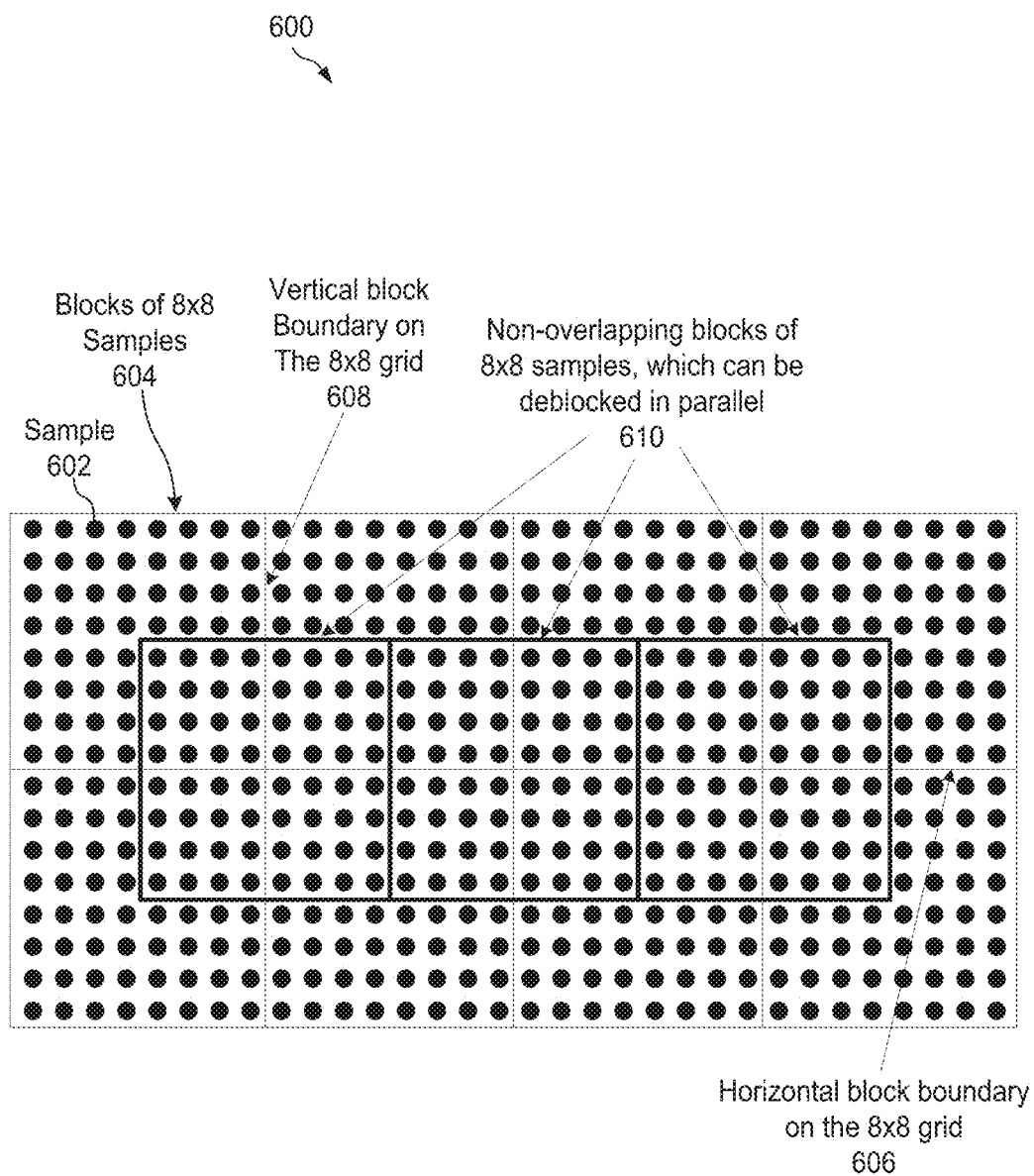
FIG. 6 is an illustration of samples within 8×8 blocks of samples.

FIG. 6 is an illustration 600 of samples 602 within 8×8 blocks of samples 604. As shown, the illustration 600 includes horizontal and vertical block boundaries on an 8×8 grid 606, 608, respectively. In addition, the illustration 600 depicts the nonoverlapping blocks of the 8×8 samples 610, which can be deblocked in parallel.

The boundary decision is discussed. Filtering is applied to 8×8 block boundaries. In addition, it must be a transform block boundary or a coding subblock boundary (e.g., due to usage of Affine motion prediction, Alternative temporal motion vector prediction (ATMVP)). For those which are not such boundaries, the filter is disabled.

The boundary strength calculation is discussed. For a transform block boundary/coding subblock boundary, if it is located in the 8×8 block boundary, the transform block boundary/coding subblock boundary may be filterd and the setting of $bS[xD_i][yD_j]$ (wherein $[xD_i][yD_j]$ denotes the coordinate) for this edge is defined in Table1 and Table 2, respectively.

TABLE 1

Boundary strength (when SPS Intra Block Copy (IBC) is disabled)

| Priority | Conditions | Y | U | V |
| --- | --- | --- | --- | --- |
| 5 | At least one of the adjacent blocks is intra | 2 | 2 | 2 |
| 4 | TU boundary and at least one of the adjacent blocks has non-zero transform coefficients | 1 | 1 | 1 |
| 3 | Reference pictures or number of motion vectors (MVs) (1 for uni-prediction, 2 for bi-prediction) of the adjacent blocks are different | 1 | N/A | N/A |
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 2

Boundary strength (when SPS IBC is enabled)

| Priority | Conditions | Y | U | V |
|---|---|---|---|---|
| 8 | At least one of the adjacent blocks is intra | 2 | 2 | 2 |
| 7 | TU boundary and at least one of the adjacent blocks has non-zero transform coefficients | 1 | 1 | 1 |
| 6 | Prediction mode of adjacent blocks is different (e.g., one is IBC, one is inter) | 1 | | |
| 5 | Both IBC and absolute difference between the motion vectors that belong to the adjacent blocks is greater than or equal to one integer luma sample | 1 | N/A | N/A |
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

The deblocking decision for a luma component is discussed.

FIG. 7 is an example 700 of pixels involved in filter on/off decision and strong/weak filter selection. A wider-stronger luma filter is used only if all of Condition 1, Condition 2, and Condition 3 are TRUE. The Condition 1 is the "large block condition." This condition detects whether the samples at P-side and Q-side belong to large blocks, which are represented by the variable bSidePisLargeBlk and bSideQisLargeBlk, respectively. The bSidePisLargeBlk and bSideQisLargeBlk are defined as follows.

bSidePisLargeBlk=((edge type is vertical and $p_0$ belongs to CU with width>=32) ||(edge type is horizontal and $p_0$ belongs to CU with height>=32))? TRUE: FALSE bSideQisLargeBlk=((edge type is vertical and $q_0$ belongs to CU with width>=32) ||(edge type is horizontal and $q_0$ belongs to CU with height>=32))? TRUE: FALSE Based on bSidePisLargeBlk and bSideQisLargeBlk, the Condition 1 is defined as follows.

Condition 1=(bSidePisLargeBlk||bSidePisLargeBlk) ? TRUE: FALSE

Next, if Condition 1 is true, Condition 2 will be further checked. First, the following variables are derived.

dp0, dp3, dq0, dq3 are first derived as in HEVC
if (p side is greater than or equal to 32)

$$dp0=(dp0+Abs(p5_0-2*p4_0+p3_0)+1)>>1$$

$$dp3=(dp3+Abs(p5_3-2*p4_3+p3_3)+1)>>1$$

if (q side is greater than or equal to 32)

$$dq0=(dq0+Abs(q5_0-2*q4_0+q3_0)+1)>>1$$

$$dq3=(dq3+Abs(q5_3-2*l\ q4_3+q3_3)+1)>>1$$

Condition 2=(d<β) ? TRUE: FALSE
where d=dp0+dq0+dp3+dq3.

If Condition 1 and Condition 2 are valid, whether any of the blocks uses sub-blocks is further checked.

```
If (bSidePisLargeBlk)
{
    If (mode block P == SUBBLOCKMODE)
        Sp =5
    else
        Sp =7
}
```

```
else
    Sp =3
If (bSideQisLargeBlk)
{
    If (mode block Q == SUBBLOCKMODE)
        Sq =5
    else
        Sq =7
}
else
    Sq =3
```

Finally, if both the Condition 1 and Condition 2 are valid, the proposed deblocking method will check Condition 3 (the large block strong filter condition), which is defined as follows.

In the Condition 3 StrongFilterCondition, the following variables are derived.

```
dpq is derived as in HEVC.
sp3 = Abs( p3 − p0 ), derived as in HEVC
if (p side is greater than or equal to 32)
    if(Sp==5)
        sp3 = ( sp3 + Abs( p5 − p3 ) + 1 ) >> 1
    else
        sp3 = ( sp3 + Abs( p7 − p3 ) + 1 ) >> 1
sq3 = Abs( q0 − q3 ), derived as in HEVC
if (q side is greater than or equal to 32)
    If(Sq==5)
        sq3 = ( sq3 + Abs( q5 − q3 ) + 1 ) >> 1
    else
        sq3 = ( sq3 + Abs( q7 − q3 ) + 1 ) >> 1
```

As in HEVC, StrongFilterCondition=(dpq is less than (β>>2), $sp_3+sq_3$ is less than (3*β>>5), and Abs($p_0-q_0$) is less than (5*tc+1)>>1)? TRUE: FALSE.

A stronger deblocking filter for luma (designed for larger blocks) is discussed.

Bilinear filtering is used when samples at either one side of a boundary belong to a large block. A sample belonging to a large block is defined as when the width≥32 for a vertical edge, and when height≥32 for a horizontal edge.

The bilinear filter is listed below.

Block boundary samples $p_i$ for i=0 to Sp−1 and $q_j$ for j=0 to Sq−1 (pi and qi are the i-th sample within a row for filtering vertical edge, or the i-th sample within a column for filtering horizontal edge) in HEVC deblocking described above) are then replaced by linear interpolation as follows.

$$p_i'=(f_i*\text{Middle}_{s,t}+(64-f_i)*P_s+32)>>6), \text{ clipped to } p_i\pm tcPD_i$$

$$q_j'=(g_j*\text{Middle}_{s,t}+(64-g_j)*Q_s+32)>>6), \text{ clipped to } q_j\pm tcPD_j$$

where $tcPD_i$ and $tcPD_j$ term is a position dependent clipping described in below and $g_j$, $f_i$, $\text{Middle}_{s,t}$, $P_s$ and $Q_s$ are given below.

A deblocking control for chroma is discussed.

The chroma strong filters are used on both sides of the block boundary. Here, the chroma filter is selected when both sides of the chroma edge are greater than or equal to 8 (chroma position), and the following decision with three conditions are satisfied. The first concerns a decision of boundary strength as well as large block. The proposed filter can be applied when the block width or height which orthogonally crosses the block edge is equal to or larger than 8 in chroma sample domain. The second and third decisions are basically the same as as HEVC luma deblocking decision, which are on/off decisions and a strong filter decision, respectively.

In the first decision, boundary strength (bS) is modified for chroma filtering and the conditions are checked sequentially. If a condition is satisfied, then the remaining conditions with lower priorities are skipped.

Chroma deblocking is performed when bS is equal to 2, or bS is equal to 1 when a large block boundary is detected.

The second and third conditions are basically the same as an HEVC luma strong filter decision, for which an example follows.

In the second condition: d is then derived as in HEVC luma deblocking. The second condition will be TRUE when d is less than $\beta$.

In the third condition StrongFilterCondition is derived as follows.

$$sp_3=\text{Abs}(p_3-p_0), \text{ derived as in HEVC}$$

$$sq_3=\text{Abs}(q_0-q_3), \text{ derived as in HEVC}$$

As in HEVC design, StrongFilterCondition=(dpq is less than ($\beta>>2$), $sp_3+sq_3$ is less than ($\beta>>3$), and $\text{Abs}(p_0-q_0)$ is less than ($5*t_c+1$)>>1).

A strong deblocking filter for chroma is discussed. The following strong deblocking filter for chroma is defined.

$$p_2'=(3*p_3+2*p_2+p_1+p_0 30\ q_04)>>3$$

$$p_1'=(2*p_3+p_2 2*p_1+p_0+q_0+q_1+4)>>3$$

$$p_0'=(p_3+p_2+p_1+2*p_0+q_0+q_1+q_2+4)>>3$$

The proposed chroma filter performs deblocking on a 4×4 chroma sample grid.

Position dependent clipping (tcPD) is discussed. The position dependent clipping tcPD is applied to the output samples of the luma filtering process involving strong and long filters that are modifying 7, 5, and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with an asymmetrical filter, depending on the result of the decision-making process in the boundary strength calculation, a position dependent threshold table is selected from two tables (i.e., Tc7 and Tc3 tabulated below) and are provided to the decoder as a side information.

$$Tc7=\{6, 5, 4, 3, 2, 1, 1\};\ Tc3=\{6, 4, 2\};$$

$$tcPD=(Sp==3)\ ?\ Tc3\text{: }Tc7;$$

$$tcQD=(Sq==3)\ ?\ Tc3\text{: }Tc7;$$

For the P or Q boundaries being filtered with a short symmetrical filter, position dependent threshold of lower magnitude is applied.

$$Tc3=\{3, 2, 1\};$$

Following defining the threshold, filtered $p'_i$ and $q'_i$ sample values are clipped according to tcP and tcQ clipping values.

$$p''_i=\text{Clip3}(p'_i+tcP_i, p'_i-tcP_i, p'_i);$$

$$q''_j=\text{Clip3}(q'_j+tcQ_j, q'_j-tcQ_j, q'_j);$$

where $p'_o$ and $q'_i$ are filtered sample values, $p''_i$ and $q''_j$ are output sample values after the clipping and $tcP_o$ $tcQ_o$ are clipping thresholds that are derived from the VVC tc parameter and tcPD and tcQD. The function Clip3 is a clipping function as it is specified in VVC.

Sub-block deblocking adjustment is discussed. To enable parallel friendly deblocking using both long filters and sub-block deblocking the long filters are restricted to modify at most 5 samples on a side that uses sub-block deblocking (AFFINE or ATMVP or decoder side motion vector refinement (DMVR)) as shown in the luma control for long filters. Additionally, the sub-block deblocking is adjusted such that the sub-block boundaries on an 8×8 grid that are close to a coding unit (CU) or an implicit TU boundary is restricted to modify at most two samples on each side.

The following applies to sub-block boundaries that not are aligned with the CU boundary.

```
If (mode block Q == SUBBLOCKMODE && edge !=0) {
    if (!(implicitTU && (edge == (64 / 4))))
        if (edge == 2 || edge == (orthogonalLength - 2) || edge == (56 / 4) || edge == (72 / 4))
            Sp = Sq = 2;
        else
            Sp = Sq = 3;
    else
        Sp = Sq = bSideQisLargeBlk ? 5:3
}
```

Where an edge equal to 0 corresponds to CU boundary, an edge equal to 2 or equal to orthogonalLength-2 corresponds to sub-block boundary 8 samples from a CU boundary, etc., where implicit TU is true if implicit split of TU is used.

Sample adaptive offset (SAO) is discussed. The input of SAO is the reconstructed samples after deblocking (DB). The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC and VVC, the region (the unit for SAO parameters signaling) is defined to be a CTU.

Two SAO types that can satisfy the requirements of low complexity are adopted in HEVC. Those two types are edge offset (EO) and band offset (BO), which are discussed in further detail below. An index of an SAO type is coded (which is in the range of [0, 2]). For EO, the sample classification is based on comparison between current samples and neighboring samples according to 1-D directional patterns, such as horizontal, vertical, 135° diagonal, and 45° diagonal.

Figure 8:
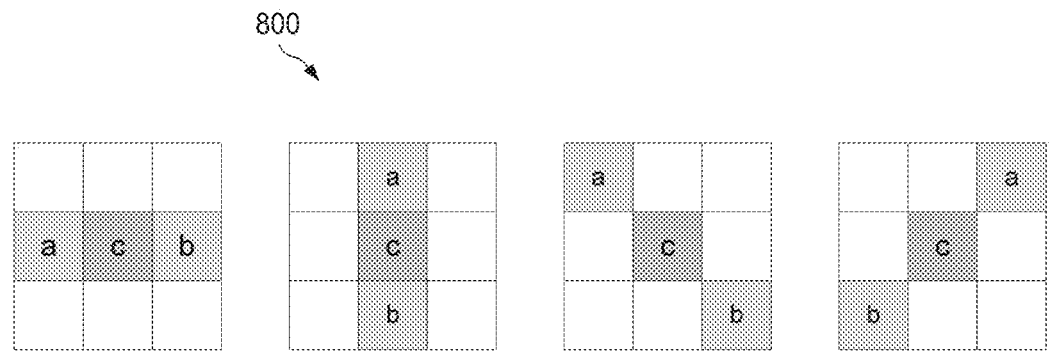
FIG. 8 shows four one dimensional (1-D) directional patterns for edge offset (EO) sample classification.

FIG. 8 shows four one dimensional (1-D) directional patterns 800 for EO sample classification: horizontal (EO class=0), vertical (EO class=1), 135° diagonal (EO class=52), and 45° diagonal (EO class=3).

For a given EO class, each sample inside the CTB is classified into one of five categories. The current sample value, labeled as "c," is compared with its two neighbors along the selected 1-D pattern. The classification rules for each sample are summarized in Table 3. Categories 1 and 4 are associated with a local valley and a local peak along the selected 1-D pattern, respectively. Categories 2 and 3 are associated with concave and convex corners along the selected 1-D pattern, respectively. If the current sample does not belong to EO categories 1-4, then it is category 0 and SAO is not applied.

TABLE 3

Sample Classification Rules for Edge Offset

| Category | Condition |
|---|---|
| 1 | c < a and c < b |
| 2 | (c < a && c == b) \|\| (c == a && c < b) |
| 3 | (c > a && c == b) \|\| (c == a && c > b) |
| 4 | c > a && c > b |
| 5 | None of above |

Geometry transformation-based adaptive loop filter in Joint Exploration Model (JEM) is discussed. The input of DB is the reconstructed samples after DB and SAO. The sample classification and filtering process are based on the reconstructed samples after DB and SAO.

In the JEM, a geometry transformation-based adaptive loop filter (GALF) with block-based filter adaption is applied. For the luma component, one among twenty-five filters is selected for each 2×2 block, based on the direction and activity of local gradients.

Figure 9:
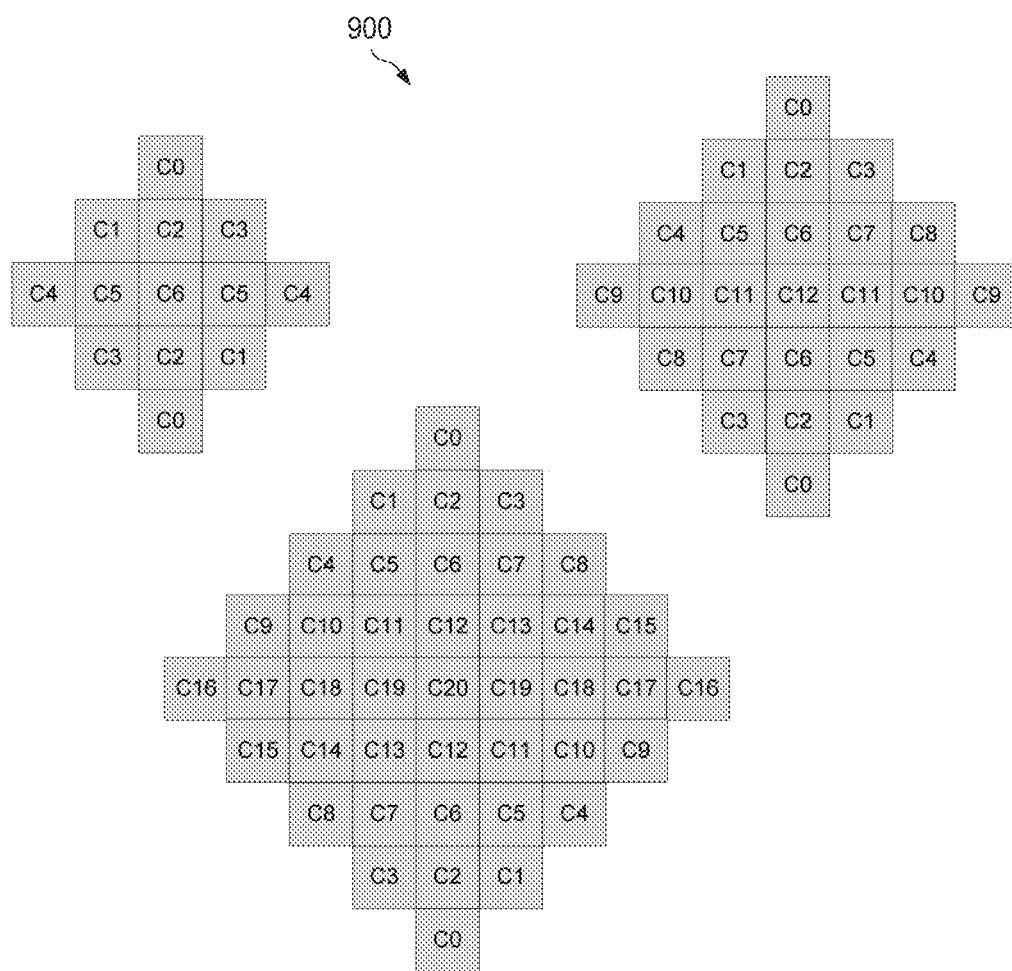
FIG. 9 shows examples of geometry transformation-based adaptive loop filter (GALF) filter shapes.

The filter shape is discussed. FIG. 9 shows examples of GALF filter shapes 900, including on the left a 5×5 diamond, on the right a 7×7 diamond, and in the middle a 9×9 diamond. In the JEM, up to three diamond filter shapes (as shown in FIG. 9) can be selected for the luma component. An index is signaled at the picture level to indicate the filter shape used for the luma component. Each square represents a sample, and Ci (i being 0-6 (left), 0-12 (right), 0-20 (middle)) denotes the coefficient to be applied to the sample. For chroma components in a picture, the 5×5 diamond shape is always used.

Block classification is discussed. Each 2×2 block is categorized into one out of twenty-five classes. The classification index C is derived based on its directionality D and a quantized value of activity Â, as follows.

$$C = 5D + \hat{A}. \quad (1)$$

To calculate D and Â, gradients of the horizontal, vertical and two diagonal direction are first calculated using 1-D Laplacian.

$$g_v = \sum_{k=i-2}^{i+3} \sum_{l=j-2}^{j+3} V_{k,l}, \; V_{k,l} = |2R(k,l) - R(k, l-1) - R(k, l+1)|, \quad (2)$$

$$g_h = \sum_{k=i-2}^{i+3} \sum_{l=j-2}^{j+3} H_{k,l}, \; H_{k,l} = |2R(k,l) - R(k-1, l) - R(k+1, l)|, \quad (3)$$

$$g_{d1} = \sum_{k=i-2}^{i+3} \sum_{l=j-2}^{j+3} D1_{k,l}, \; D1_{k,l} = |2R(k,l) - R(k-1, l-1) - R(k+1, l+1)| \quad (4)$$

$$g_{d2} = \sum_{k=i-2}^{i+3} \sum_{j=j-2}^{j+3} D2_{k,l}, \; D2_{k,l} = |2R(k,l) - R(k-1, l+1) - R(k+1, l-1)| \quad (5)$$

Indices i and j refer to the coordinates of the upper left sample in the 2×2 block and R(i, j) indicates a reconstructed sample at coordinate (i,j).

Then D maximum and minimum values of the gradients of horizontal and vertical directions are set as:

$$g_{h,v}^{max} = \max(g_h, g_v), \; g_{h,v}^{min} = \min(g_h, g_v), \quad (6)$$

and the maximum and minimum values of the gradient of two diagonal directions are set as:

$$g_{d0,d1}^{max}(g_{d0}, g_{d1}), \; g_{d0,d1}^{min}(g_{d0}, g_{d1}), \quad (7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot D$ is set to 4; otherwise D is set to 3.

The activity value A is calculated as:

$$A = \sum_{k=i-2}^{i+3} \sum_{l=j-2}^{j+3} (V_{k,l} + H_{k,l}). \quad (8)$$

A is further quantized to the range of 0 to 4, inclusively, and the quantized value is denoted as Â.

For both chroma components in a picture, no classification method is applied, i.e. a single set of ALF coefficients is applied for each chroma component.

Geometric transformation of filter coefficients is discussed.

Figure 10:
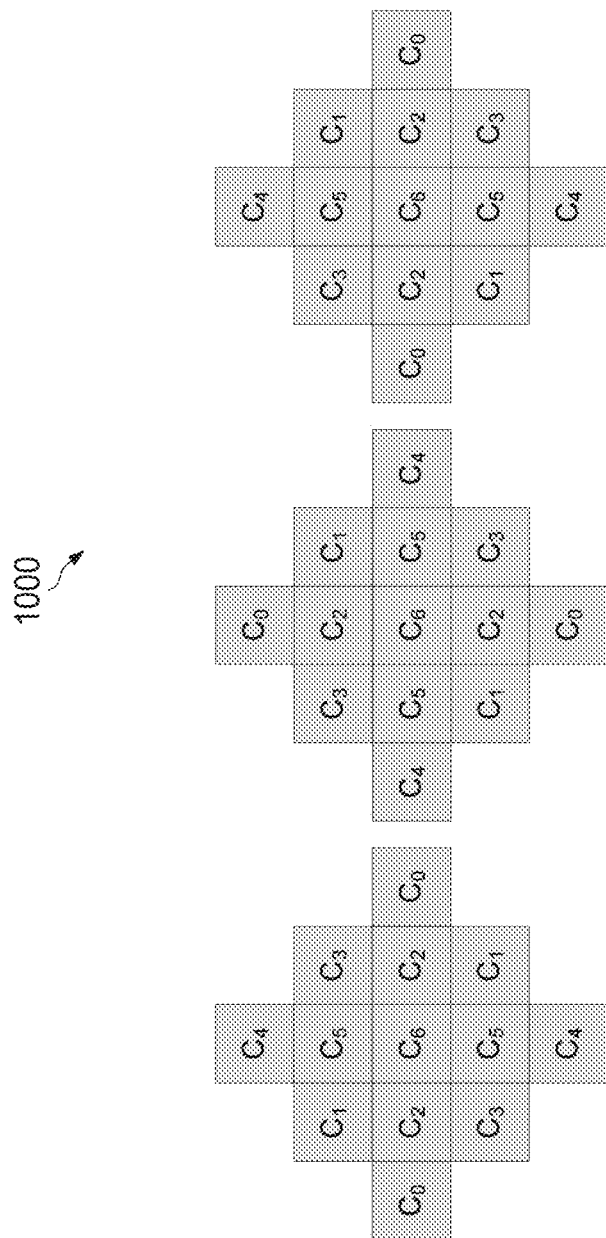
FIG. 10 shows an example of relative coordinates used for a 5×5 diamond filter support.

FIG. 10 shows an example of relative coordinates 1000 for a 5×5 diamond filter support, such as diagonal, vertical flip, and rotation, respectively (from left to right).

Before filtering each 2×2 block, geometric transformations such as rotation or diagonal and vertical flipping are applied to the filter coefficients f (k, l), which is associated with the coordinate (k, l), depending on gradient values calculated for that block. This is equivalent to applying these transformations to the samples in the filter support region. The idea is to make different blocks to which ALF is applied more similar by aligning their directionality.

Three geometric transformations, including diagonal, vertical flip, and rotation are introduced:

$$\text{Diagonal}: f_D(k, l) = f(l, k), \quad (9)$$

$$\text{Vertical flip}: f_V(k, l) = f(k, K - l - 1),$$

$$\text{Rotation}: f_R(k, l) = f(K - l - 1, k).$$

where K is the size of the filter and 0≤k, l≤K−1 are coefficients coordinates, such that location (0,0) is at the upper left corner and location (K−1, K−1) is at the lower right corner. The transformations are applied to the filter coefficients f (k, l) depending on gradient values calculated for that block. The relationship between the transformation and the four gradients of the four directions are summarized in Table 4.

TABLE 1

Mapping of the gradient calculated for one block and the transformations

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Filter parameters signaling is discussed. In the JEM, GALF filter parameters are signalled for the first CTU, i.e., after the slice header and before the SAO parameters of the first CTU. Up to 25 sets of luma filter coefficients could be signalled. To reduce bits overhead, filter coefficients of different classification can be merged. Also, the GALF coefficients of reference pictures are stored and allowed to be reused as GALF coefficients of a current picture. The current picture may choose to use GALF coefficients stored for the reference pictures and bypass the GALF coefficients signalling. In this case, only an index to one of the reference pictures is signalled, and the stored GALF coefficients of the indicated reference picture are inherited for the current picture.

To support GALF temporal prediction, a candidate list of GALF filter sets is maintained. At the beginning of decoding a new sequence, the candidate list is empty. After decoding one picture, the corresponding set of filters may be added to the candidate list. Once the size of the candidate list reaches the maximum allowed value (i.e., 6 in current JEM), a new set of filters overwrites the oldest set in decoding order, and that is, first-in-first-out (FIFO) rule is applied to update the candidate list. To avoid duplications, a set could only be added to the list when the corresponding picture does not use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and the k-th array only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter coded frames to minimize signalling overhead. For intra frames, temporal prediction is not available, and a set of 16 fixed filters is assigned to each class. To indicate the usage of the fixed filter, a flag for each class is signalled and if required, the index of the chosen fixed filter. Even when the fixed filter is selected for a given class, the coefficients of the adaptive filter f (k, l) can still be sent for this class in which case the coefficients of the filter which will be applied to the reconstructed image are sum of both sets of coefficients.

The filtering process of a luma component can be controlled at the CU level. A flag is signalled to indicate whether GALF is applied to the luma component of a CU. For chroma component, whether GALF is applied or not is indicated at picture level only.

The filtering process is discussed. At the decoder side, when GALF is enabled for a block, each sample R(i, j) within the block is filtered, resulting in sample value R' (i, j) as shown below, where L denotes filter length, and f (k, l) denotes the decoded filter coefficients.

$$R'(i, j) = \sum_{k=-L/2}^{L/2} \sum_{l=-L/2}^{L/2} f(k, l) \times R(i+k, j+l) \quad (1)$$

Figure 11:
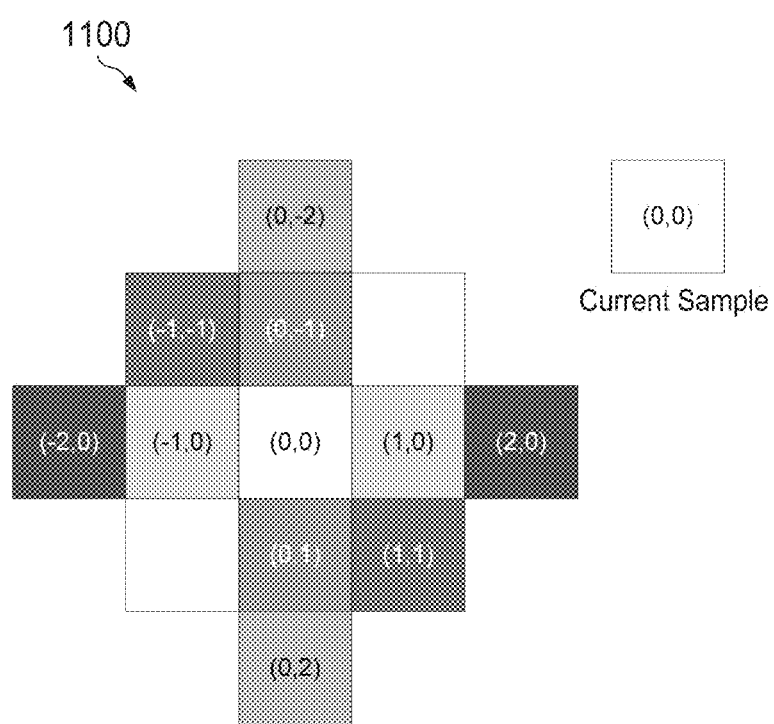
FIG. 11 shows another example of relative coordinates used for the 5×5 diamond filter support.

FIG. 11 shows another example of relative coordinates used for the 5×5 diamond filter support supposing the current sample's coordinate (i, j) to be (0, 0). Samples in different coordinates filled with the same color are multiplied with the same filter coefficients.

Geometry transformation-based adaptive loop filter (GALF) in VVC is discussed. In VVC test model 4.0 (VTM4.0), the filtering process of the Adaptive Loop Filter, is performed as follows:

$$O(x, y) = \sum_{(i, j)} w(i, j) \cdot I(x+i, y+j), \quad (11)$$

where samples I(x+i, y+j) are input samples, O(x, y) is the filtered output sample (i.e., filter result), and w(i, j) denotes the filter coefficients. In practice, VTM4.0 is implemented using integer arithmetic for fixed point precision computations $$O(x, y) = \left( \sum_{i=-\frac{L}{2}}^{\frac{L}{2}} \sum_{j=-\frac{L}{2}}^{\frac{L}{2}} w(i, j) \cdot I(x+i, y+j) + 64 \right) >> 7, \quad (12)$$

where L denotes the filter length, and where w(i, j) are the filter coefficients in fixed point precision.

The current design of GALF in VVC has the following major changes compared to that of JEM:
1) The adaptive filter shape is removed. Only a 7×7 filter shape is allowed for a luma component and a 5×5 filter shape is allowed for chroma components.
2) Signaling of ALF parameters is removed from slice/picture level to the CTU level.
3) Calculation of class index is performed in a 4×4 level instead of a 2×2 level. In addition, as proposed in JVET-L0147, sub-sampled Laplacian calculation method for ALF classification is utilized. More specifically, there is no need to calculate the horizontal/vertical/45 diagonal/135 degree gradients for each sample within one block. Instead, 1:2 subsampling is utilized.

Non-linear ALF in the current VVC is discussed with regard to filtering reformulation.

Equation (11) can be reformulated, without coding efficiency impact, in the following expression:

$$O(x, y) = I(x, y) + \Sigma_{(i, j) \neq (0,0)}\, w(i,j) \cdot (I((x+i, y+j) - I(x, y)), \quad (2)$$

where w(i, j) are the same filter coefficients as in equation (11) [excepted w(0, 0) which is equal to 1 in equation (13) while it is equal to $1 - \Sigma_{(i, j) \neq (0,0)}\, w(i, j)$ in equation (11)].

Using the above filter formula of equation (13), VVC introduces the non-linearity to make ALF more efficient by using a simple clipping function to reduce the impact of neighbor sample values (I(x+i, y+j)) when they are too different with the current sample value (I(x, y)) being filtered.

More specifically, the ALF filter is modified as follows:

$$O'(x, y) = I(x, y) + \Sigma_{(i, j) \neq (0,0)}\, w(i, j) \cdot K(I(x+i, y+j) - I(x, y), k(i, j)), \quad (14)$$

where K(d, b)=min(b, max(−b, d)) is the clipping function, and k(i, j) are clipping parameters, which depends on the (i, j) filter coefficient. The encoder performs the optimization to find the best k(i, j).

In the JVET-N0242 implementation, the clipping parameters k(i, j) are specified for each ALF filter, and one clipping value is signaled per filter coefficient. It means that up to 12 clipping values can be signalled in the bitstream per luma filter and up to 6 clipping values for the chroma filter.

In order to limit the signaling cost and the encoder complexity, only 4 fixed values which are the same for INTER and INTRA slices are used.

Because the variance of the local differences is often higher for luma filters than for chroma filters, two different sets for the luma and chroma filters are applied. The maximum sample value (here 1024 for 10 bits bit-depth) in each set is also introduced, so that clipping can be disabled if it is not necessary.

The sets of clipping values used in the JVET-N0242 tests are provided in Table 5. The 4 values have been selected by roughly equally splitting, in the logarithmic domain, the full range of the sample values (coded on 10 bits) for luma filters, and the range from 4 to 1024 for chroma filters.

More precisely, the luma filter table of clipping values have been obtained by the following formula:

$$AlfClip_L = \left\{ \text{round}\left( ((M)^{\frac{1}{N}})^{N-n+1} \right) \text{ for } n \in 1 \ldots N \right\}, \quad (15)$$

with $M = 2^{10}$ and $N = 4$.

Similarly, the chroma filter tables of clipping values are obtained according to the following formula:

$$AlfClip_C = \left\{ \text{round}\left( A \cdot \left( \left(\frac{M}{A}\right)^{\frac{1}{N-1}} \right)^{N-n} \right) \text{ for } n \in 1 \ldots N \right\}, \quad (16)$$

with $M = 2^{10}$, $N = 4$ and $A = 4$.

TABLE 5

Authorized clipping values

| | INTRA/INTER tile group |
|---|---|
| LUMA | {1024, 181, 32, 6} |
| CHROMA | {1024, 161, 25, 4} |

The selected clipping values are coded in the "alf_data" syntax element by using a Golomb encoding scheme corresponding to the index of the clipping value in the above Table 5. This encoding scheme is the same as the encoding scheme for the filter index.

Convolutional Neural network-based loop filters for video coding are discussed.

In deep learning, a convolutional neural network (CNN, or ConvNet) is a class of deep neural networks, most commonly applied to analyzing visual imagery. They have very successful applications in image and video recognition/processing, recommender systems, image classification, medical image analysis, and natural language processing.

CNNs are regularized versions of multilayer perceptrons. Multilayer perceptrons usually mean fully connected networks, that is, each neuron in one layer is connected to all neurons in the next layer. The "fully-connectedness" of these networks makes them prone to overfitting data. Typical ways of regularization include adding some form of magnitude measurement of weights to the loss function. CNNs take a different approach towards regularization. CNNs take advantage of the hierarchical pattern in data and assemble more complex patterns using smaller and simpler patterns. Therefore, on the scale of connectedness and complexity, CNNs are on the lower extreme.

CNNs use relatively little pre-processing compared to other image classification/processing algorithms. This means that the network learns the filters that in traditional algorithms were hand-engineered. This independence from prior knowledge and human effort in feature design is a major advantage.

Deep learning-based image/video compression typically has two implications and types: 1) end-to-end compression purely based on neural networks and 2) traditional frameworks enhanced by neural networks. End-to-end compression purely based on neural networks are discussed in Johannes Ballé, Valero Laparra, and Eero P. Simoncelli, "End-to-end optimization of nonlinear transform codes for perceptual quality," 2016 Picture Coding Symposium (PCS), pp. 1-5, Institute of Electrical and Electronics Engineers (IEEE), and Lucas Theis, Wenzhe Shi, Andrew Cunningham, and Ferenc Huszár, "Lossy image compression with compressive autoencoders," arXiv preprint arXiv: 1703.00395 (2017). Traditional frameworks enhanced by neural networks are discussed in Jiahao Li, Bin Li, Jizheng Xu, Ruiqin Xiong, and Wen Gao, "Fully Connected Network-Based Intra Prediction for Image Coding," IEEE Transactions on Image Processing 27, 7 (2018), 3236-3247, Yuanying Dai, Dong Liu, and Feng Wu, "A convolutional neural network approach for post-processing in HEVC intra coding," MMM. Springer, 28-39, Rui Song, Dong Liu, Houqiang Li, and Feng Wu, "Neural network-based arithmetic coding of intra prediction modes in HEVC," VCIP. IEEE, 1-4, and J. Pfaff, P. Helle, D. Manny, S. Kaltenstadler, W. Samek, H. Schwarz, D. Marpe, and T. Wiegand, "Neural network based intra prediction for video coding," Applications of Digital Image Processing XLI, Vol. 10752. International Society for Optics and Photonics, 1075213.

The first type usually takes an auto-encoder like structure, either achieved by convolutional neural networks or recurrent neural networks. While purely relying on neural networks for image/video compression can avoid any manual optimizations or hand-crafted designs, compression efficiency may be not satisfactory. Therefore, works distributed in the second type take neural networks as an auxiliary, and enhance traditional compression frameworks by replacing or enhancing some modules. In this way, they can inherit the merits of the highly optimized traditional frameworks. For example, a fully connected network for intra prediction is proposed in HEVC as discussed in Jiahao Li, Bin Li, Jizheng Xu, Ruiqin Xiong, and Wen Gao, "Fully Connected Network-Based Intra Prediction for Image Coding," IEEE Transactions on Image Processing 27, 7 (2018), p. 3236-3247.

In addition to intra prediction, deep learning-based image/video compression is also exploited to enhance other modules. For example, the in-loop filters of HEVC are replaced with a convolutional neural network and achieve promising results in Yuanying Dai, Dong Liu, and Feng Wu, "A convolutional neural network approach for post-processing in HEVC intra coding," MMM. Springer, 28-39. The work in Rui Song, Dong Liu, Houqiang Li, and Feng Wu, "Neural network-based arithmetic coding of intra prediction modes in HEVC," VCIP. IEEE, 1-4 applies neural networks to improve the arithmetic coding engine.

Convolutional neural network based in-loop filtering is discussed. In lossy image/video compression, the reconstructed frame is an approximation of the original frame, since the quantization process is not invertible and thus incurs distortion to the reconstructed frame. To alleviate such distortion, a convolutional neural network could be trained to learn the mapping from the distorted frame to the original frame. In practice, training must be performed prior to deploying the CNN-based in-loop filtering.

Training is discussed. The purpose of the training processing is to find the optimal value of parameters including weights and bias.

First, a codec (e.g. HM, JEM, VTM, etc.) is used to compress the training dataset to generate the distorted reconstruction frames. Then, the reconstructed frames are fed into the CNN and the cost is calculated using the output of CNN and the groundtruth frames (original frames). Commonly used cost functions include Sum of Absolution Difference (SAD) and Mean Square Error (MSE). Next, the gradient of the cost with respect to each parameter is derived through the back propagation algorithm. With the gradients, the values of the parameters can be updated. The above process repeats until the convergence criteria is met. After completing the training, the derived optimal parameters are saved for use in the inference stage.

The convolutional process is discussed. During convolution, the filter is moved across the image from left to right, top to bottom, with a one-pixel column change on the horizontal movements, then a one-pixel row change on the vertical movements. The amount of movement between applications of the filter to the input image is referred to as the stride, and it is almost always symmetrical in height and width dimensions. The default stride or strides in two dimensions is (1,1) for the height and the width movement.

Figure 12A:
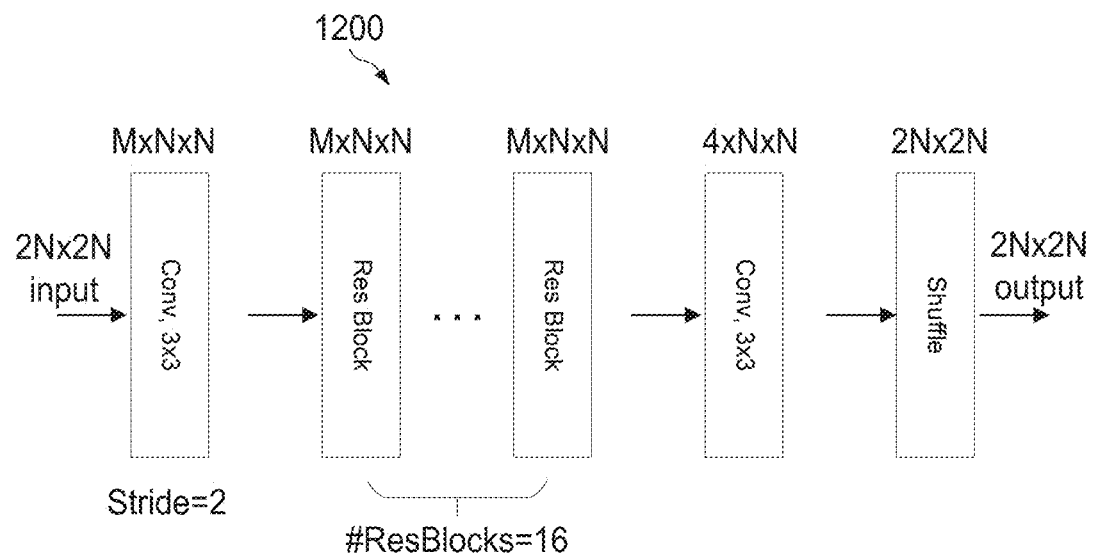
FIG. 12A is an example architecture of a proposed CNN filter.
Figure 12B:
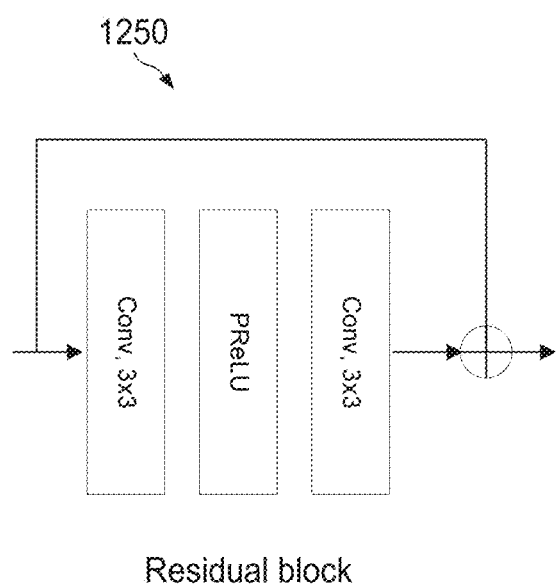
FIG. 12B is an example of construction of a residual block (ResBlock).

FIG. 12A is an example architecture 1200 of a proposed CNN filter, and FIG. 12B is an example of construction 1250 of a residual block (ResBlock). In most of deep convolutional neural networks, residual blocks are utilized as the basic module and stacked several times to construct the final network wherein in one example, the residual block is obtained by combining a convolutional layer, a ReLU/PReLU activation function and a convolutional layer as shown in FIG. 12B.

Figure 13:
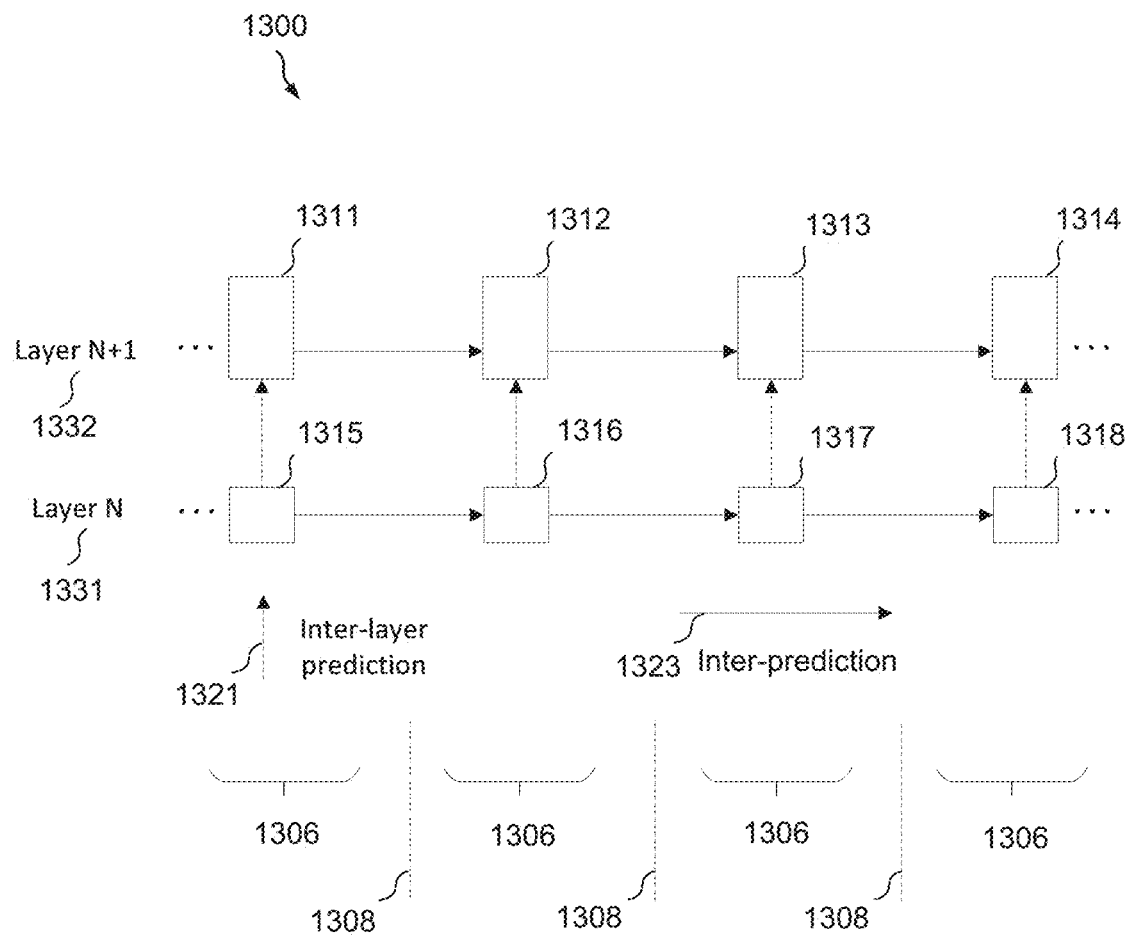
FIG. 13 is a schematic diagram illustrating an example of layer based prediction.

FIG. 13 is a schematic diagram illustrating an example of layer based prediction 1300. Layer based prediction 1300 is compatible with unidirectional inter-prediction and/or bidirectional inter-prediction, but is also performed between pictures in different layers.

Layer based prediction 1300 is applied between pictures 1311, 1312, 1313, and 1314 and pictures 1315, 1316, 1317, and 1318 in different layers. In the example shown, pictures 1311, 1312, 1313, and 1314 are part of layer N+1 1332 and pictures 1315, 1316, 1317, and 1318 are part of layer N 1331. A layer, such as layer N 1331 and/or layer N+1 1332, is a group of pictures that are all associated with a similar value of a characteristic, such as a similar size, quality, resolution, signal to noise ratio, capability, etc. In the example shown, layer N+1 1332 is associated with a larger image size than layer N 131. Accordingly, pictures 1311, 1312, 1313, and 1314 in layer N+1 1332 have a larger picture size (e.g., larger height and width and hence more samples) than pictures 1315, 1316, 1317, and 1318 in layer N 1331 in this example. However, such pictures can be separated between layer N+1 1332 and layer N 1331 by other characteristics. While only two layers, layer N+1 1332 and layer N 1331, are shown, a set of pictures can be separated into any number of layers based on associated characteristics. Layer N+1 1332 and layer N 1331 may also be denoted by a layer identifier (ID). A layer ID is an item of data that is associated with a picture and denotes the picture is part of an indicated layer. Accordingly, each picture 1311-1318 may be associated with a corresponding layer ID to indicate which layer N+1 1332 or layer N 1331 includes the corresponding picture.

Pictures 1311-1318 in different layer N 1331 and Layer N+1 1332 are configured to be displayed in the alternative. As such, pictures 1311-1318 in different layers 1331-1332 can share the same temporal identifier (ID) and can be included in the same access unit (AU) 1306. As used herein, an AU is a set of one or more coded pictures associated with the same display time for output from a decoded picture buffer (DPB). For example, a decoder may decode and display picture 1315 at a current display time if a smaller picture is desired or the decoder may decode and display picture 1311 at the current display time if a larger picture is desired. As such, pictures 1311-1314 at higher layer N+1 1332 contain substantially the same image data as corresponding pictures 1315-1318 at lower layer N 1331 (notwithstanding the difference in picture size). Specifically, picture 1311 contains substantially the same image data as picture 1315, picture 1312 contains substantially the same image data as picture 1316, etc.

Pictures 1311-1318 can be coded by reference to other pictures 1311-1318 in the same layer N 1331 or layer N+1 1332. Coding a picture in reference to another picture in the same layer results in inter-prediction 1323, which is compatible unidirectional inter-prediction and/or bidirectional inter-prediction. Inter-prediction 1323 is depicted by solid line arrows. For example, picture 1313 may be coded by employing inter-prediction 1323 using one or two of pictures 1311, 1312, and/or 1314 in layer N+1 1332 as a reference, where one picture is referenced for unidirectional inter-prediction and/or two pictures are referenced for bidirectional inter-prediction. Further, picture 1317 may be coded by employing inter-prediction 1323 using one or two of pictures 1315, 1316, and/or 1318 in layer N 1331 as a reference, where one picture is referenced for unidirectional inter-prediction and/or two pictures are referenced for bidirectional inter-prediction. When a picture is used as a reference for another picture in the same layer when performing inter-prediction 1323, the picture may be referred to as a reference picture. For example, picture 1312 may be a reference picture used to code picture 1313 according to inter-prediction 1323. Inter-prediction 1323 can also be referred to as intra-layer prediction in a multi-layer context. As such, inter-prediction 1323 is a mechanism of coding samples of a current picture by reference to indicated samples in a reference picture that are different from the current picture where the reference picture and the current picture are in the same layer.

Pictures 1311-1318 can also be coded by reference to other pictures 1311-1318 in different layers. This process is known as inter-layer prediction 1321, and is depicted by dashed arrows. Inter-layer prediction 1321 is a mechanism of coding samples of a current picture by reference to indicated samples in a reference picture where the current picture and the reference picture are in different layers and hence have different layer IDs. For example, a picture in a lower layer N 1331 can be used as a reference picture to code a corresponding picture at a higher layer N+1 1332. As a specific example, picture 1311 can be coded by reference to picture 1315 according to inter-layer prediction 1321. In such a case, the picture 1315 is used as an inter-layer reference picture. An inter-layer reference picture is a reference picture used for inter-layer prediction 1321. In most cases, inter-layer prediction 1321 is constrained such that a current picture, such as picture 1311, can only use inter-layer reference picture(s) that are included in the same AU 1306 and that are at a lower layer, such as picture 1315. When multiple layers (e.g., more than two) are available, inter-layer prediction 1321 can encode/decode a current picture based on multiple inter-layer reference picture(s) at lower levels than the current picture.

A video encoder can employ layer based prediction 1300 to encode pictures 1311-1318 via many different combinations and/or permutations of inter-prediction 1323 and inter-layer prediction 1321. For example, picture 1315 may be coded according to intra-prediction. Pictures 1316-1318 can then be coded according to inter-prediction 1323 by using picture 1315 as a reference picture. Further, picture 1311 may be coded according to inter-layer prediction 1321 by using picture 1315 as an inter-layer reference picture. Pictures 1312-1314 can then be coded according to inter-prediction 1323 by using picture 1311 as a reference picture. As such, a reference picture can serve as both a single layer reference picture and an inter-layer reference picture for different coding mechanisms. By coding higher layer N+1 1332 pictures based on lower layer N 1331 pictures, the higher layer N+1 1332 can avoid employing intra-prediction, which has much lower coding efficiency than inter-prediction 1323 and inter-layer prediction 1321. As such, the poor coding efficiency of intra-prediction can be limited to the smallest/lowest quality pictures, and hence limited to coding the smallest amount of video data. The pictures used as reference pictures and/or inter-layer reference pictures can be indicated in entries of reference picture list(s) contained in a reference picture list structure.

Each AU 1306 in FIG. 13 may contain several pictures. For example, one AU 1306 may contain pictures 1311 and 1315. Another AU 1306 may contain pictures 1312 and 1316. Indeed, each AU 1306 is a set of one or more coded pictures associated with the same display time (e.g., the same temporal ID) for output from a decoded picture buffer (DPB) (e.g., for display to a user). Each access unit delimiter (AUD) 1308 is an indicator or data structure used to indicate the start of an AU (e.g., AU 1308) or the boundary between AUs.

Previous H.26x video coding families have provided support for scalability in separate profile(s) from the profile(s) for single-layer coding. Scalable video coding (SVC) is the scalable extension of the AVC/H.264 that provides support for spatial, temporal, and quality scalabilities. For SVC, a flag is signaled in each macroblock (MB) in enhancement layer (EL) pictures to indicate whether the EL MB is predicted using the collocated block from a lower layer. The prediction from the collocated block may include texture, motion vectors, and/or coding modes. Implementations of SVC cannot directly reuse unmodified H.264/AVC implementations in their design. The SVC EL macroblock syntax and decoding process differs from H.264/AVC syntax and decoding process.

Scalable HEVC (SHVC) is the extension of the HEVC/H.265 standard that provides support for spatial and quality scalabilities, multiview HEVC (MV-HEVC) is the extension of the HEVC/H.265 that provides support for multi-view scalability, and 3D HEVC (3D-HEVC) is the extension of the HEVC/H.264 that provides support for three-dimensional (3D) video coding that is more advanced and more efficient than MV-HEVC. Note that the temporal scalability is included as an integral part of the single-layer HEVC codec. The design of the multi-layer extension of HEVC employs the idea where the decoded pictures used for inter-layer prediction come only from the same AU and are treated as long-term reference pictures (LTRPs), and are assigned reference indices in the reference picture list(s) along with other temporal reference pictures in the current layer. Inter-layer prediction (ILP) is achieved at the prediction unit (PU) level by setting the value of the reference index to refer to the inter-layer reference picture(s) in the reference picture list(s).

Notably, both reference picture resampling and spatial scalability features call for resampling of a reference picture or part thereof. Reference picture resampling (RPR) can be realized at either the picture level or coding block level. However, when RPR is referred to as a coding feature, it is a feature for single-layer coding. Even so, it is possible or even preferable from a codec design point of view to use the same resampling filter for both the RPR feature of single-layer coding and the spatial scalability feature for multi-layer coding.

Figure 14:
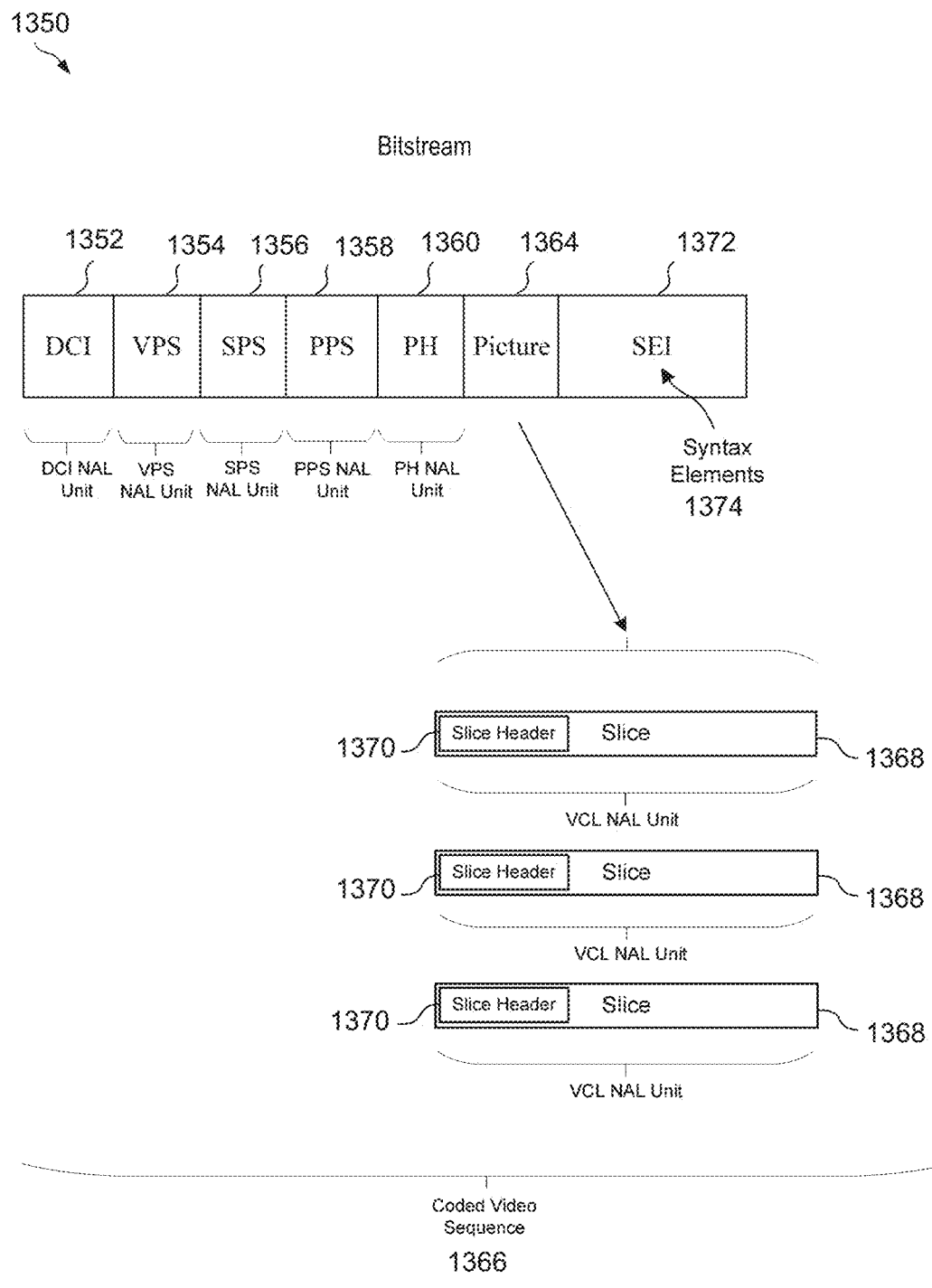
FIG. 14 illustrates an embodiment of a video bitstream.

FIG. 14 illustrates an embodiment of a video bitstream 1350. As used herein the video bitstream 1350 may also be referred to as a coded video bitstream, a bitstream, or variations thereof. As shown in FIG. 14, the bitstream 1350 comprises one or more of the following: decoding capability information (DCI) 1352, a video parameter set (VPS) 1354, a sequence parameter set (SPS) 1356, a picture parameter set (PPS) 1358, a picture header (PH) 1360, a picture 1364, and an SEI message 1372. Each of the DCI 1352, the VPS 1354, the SPS 1356, and the PPS 1358 may be generically referred to as a parameter set. In an embodiment, other parameter sets not shown in FIG. 14 may also be included in the bitstream 1350 such as, for example, an adaption parameter set (APS), which is a syntax structure containing syntax elements that apply to zero or more slices as determined by zero or more syntax elements found in slice headers.

The DCI 1352, which may also be referred to a decoding parameter set (DPS) or decoder parameter set, is a syntax structure containing syntax elements that apply to the entire bitstream. The DCI 1352 includes parameters that stay constant for the lifetime of the video bitstream (e.g., bitstream 1350), which can translate to the lifetime of a session. The DCI 1352 can include profile, level, and sub-profile information to determine a maximum complexity interop point that is guaranteed to be never exceeded, even if splicing of video sequences occurs within a session. It further optionally includes constraint flags, which indicate that the video bitstream will be constraint of the use of certain features as indicated by the values of those flags. With this, a bitstream can be labelled as not using certain tools, which allows among other things for resource allocation in a decoder implementation. Like all parameter sets, the DCI 1352 is present when first referenced, and referenced by the very first picture in a video sequence, implying that it has to be sent among the first network abstraction layer (NAL) units in the bitstream. While multiple DCIs 1352 can be in the bitstream, the value of the syntax elements therein cannot be inconsistent when being referenced.

The VPS 1354 includes decoding dependency or information for reference picture set construction of enhancement layers. The VPS 1354 provides an overall perspective or view of a scalable sequence, including what types of operation points are provided, the profile, tier, and level of the operation points, and some other high-level properties of the bitstream that can be used as the basis for session negotiation and content selection, etc.

In an embodiment, when it is indicated that some of the layers use ILP, the VPS 1354 indicates that a total number of OLSs specified by the VPS is equal to the number of layers, indicates that the i-th OLS includes the layers with layer indices from 0 to i, inclusive, and indicates that for each OLS only the highest layer in the OLS is output.

The SPS 1356 contains data that is common to all the pictures in a sequence of pictures (SOP). The SPS 1356 is a syntax structure containing syntax elements that apply to zero or more entire coded layer video sequences (CLVSs) as determined by the content of a syntax element found in the PPS 1358 referred to by a syntax element found in each picture header 1360. In contrast, the PPS 1358 contains data that is common to the entire picture 1364. The PPS 1358 is a syntax structure containing syntax elements that apply to zero or more entire coded pictures as determined by a syntax element found in each picture header (e.g., PH 1360).

The DCI 1352, the VPS 1354, the SPS 1356, and the PPS 1358 are contained in different types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important data that can apply to a number of VCL NAL units) and supplemental enhancement information (timing information and other supplemental data that may enhance usability of the decoded video signal but are not necessary for decoding the values of the samples in the video pictures).

In an embodiment, the DCI 1352 is contained in a non-VCL NAL unit designated as a DCI NAL unit or a DPS NAL unit. That is, the DCI NAL unit has a DCI NAL unit type (NUT) and the DPS NAL unit has a DPS NUT. In an embodiment, the VPS 1354 is contained in a non-VCL NAL unit designated as a VPS NAL unit. Therefore, the VPS NAL unit has a VPS NUT. In an embodiment, the SPS 1356 is a non-VCL NAL unit designated as a SPS NAL unit. Therefore, the SPS NAL unit has an SPS NUT. In an embodiment, the PPS 1358 is contained in a non-VCL NAL unit designated as a PPS NAL unit. Therefore, the PPS NAL unit has a PPS NUT.

The PH 1360 is a syntax structure containing syntax elements that apply to all slices (e.g., slices 1368) of a coded picture (e.g., picture 1364). In an embodiment, the PH 1360 is in a type of non-VCL NAL unit designated as a PH NAL unit. Therefore, the PH NAL unit has a PH NUT (e.g., PH NUT).

In an embodiment, the PH NAL unit associated with the PH 1360 has a temporal ID and a layer ID. The temporal ID identifier indicates the position of the PH NAL unit, in time, relative to the other PH NAL units in the bitstream (e.g., bitstream 1350). The layer ID indicates the layer that contains the PH NAL unit. In an embodiment, the temporal ID is similar to, but different from, the picture order count (POC). The POC uniquely identifies each picture in order. In a single layer bitstream, temporal ID and POC would be the same. In a multi-layer bitstream, pictures in the same AU would have different POCs, but the same temporal ID.

In an embodiment, the PH NAL unit precedes the VCL NAL unit containing the first slice 1368 of the associated picture 1364. This establishes the association between the PH 1360 and the slices 1368 of the picture 1364 associated with the PH 1360 without the need to have a picture header ID signaled in the PH 1360 and referred to from the slice header 1370. Consequently, it can be inferred that all VCL NAL units between two PHs 1360 belong to the same picture 1364 and that the picture 1364 is associated with the first PH 1360 between the two PHs 1360. In an embodiment, the first VCL NAL unit that follows a PH 1360 contains the first slice 1368 of the picture 1364 associated with the PH 1360.

In an embodiment, the PH NAL unit follows picture level parameter sets (e.g., the PPS 1358) or higher level parameter sets such as the DCI 1352 (a.k.a., the DPS), the VPS 1354, the SPS 1356, the PPS 1358, etc., having both a temporal ID and a layer ID less than the temporal ID and layer ID of the PH NAL unit, respectively. Consequently, those parameter sets are not repeated within a picture or an access unit. Because of this ordering, the PH 1360 can be resolved immediately. That is, parameter sets that contain parameters relevant to an entire picture are positioned in the bitstream before the PH NAL unit. Anything that contains parameters for part of a picture is positioned after the PH NAL unit.

In one alternative, the PH NAL unit follows picture level parameter sets and prefix supplemental enhancement information (SEI) messages, or higher level parameter sets such as the DCI 1352 (a.k.a., the DPS), the VPS 1354, the SPS 1356, the PPS 1358, the APS, the SEI message 1372, etc.

The picture 1364 is an array of luma samples in monochrome format or an array of luma samples and two corresponding arrays of chroma samples in 4:2:0, 4:2:2, and 4:4:4 color format.

The picture 1364 may be either a frame or a field. However, in one coded video sequence (CVS) 1366, either all pictures 1364 are frames or all pictures 1364 are fields. The CVS 1366 is a coded video sequence for every coded layer video sequence (CLVS) in the video bitstream 1350. Notably, the CVS 1366 and the CLVS are the same when the video bitstream 1350 includes a single layer. The CVS 1366 and the CLVS are only different when the video bitstream 1350 includes multiple layers.

Each picture 1364 contains one or more slices 1368. A slice 1368 is an integer number of complete tiles or an integer number of consecutive complete coding tree unit (CTU) rows within a tile of a picture (e.g., picture 1364). Each slice 1368 is exclusively contained in a single NAL unit (e.g., a VCL NAL unit). A tile (not shown) is a rectangular region of CTUs within a particular tile column and a particular tile row in a picture (e.g., picture 1364). A CTU (not shown) is a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB (not shown) is an N×N block of samples for some value of N such that the division of a component into CTBs is a partitioning. A block (not shown) is an M×N (M-column by N-row) array of samples (e.g., pixels), or an M×N array of transform coefficients.

In an embodiment, each slice 1368 contains a slice header 1370. A slice header 1370 is the part of the coded slice 1368 containing the data elements pertaining to all tiles or CTU rows within a tile represented in the slice 1368. That is, the slice header 1370 contains information about the slice 1368 such as, for example, the slice type, which of the reference pictures will be used, and so on.

The pictures 1364 and their slices 1368 comprise data associated with the images or video being encoded or decoded. Thus, the pictures 1364 and their slices 1368 may be simply referred to as the payload or data being carried in the bitstream 1350.

The bitstream 1350 also contains one or more SEI messages, such as SEI message 1372, which contain supplemental enhancement information. SEI messages can contain various types of data that indicate the timing of the video pictures or describe various properties of the coded video or how the coded video can be used or enhanced. SEI messages are also defined that can contain arbitrary user-defined data. SEI messages do not affect the core decoding process, but can indicate how the video is recommended to be post-processed or displayed. Some other high-level properties of the video content are conveyed in video usability information (VUI), such as the indication of the color space for interpretation of the video content. As new color spaces have been developed, such as for high dynamic range and wide color gamut video, additional VUI identifiers have been added to indicate them.

Those skilled in the art will appreciate that the bitstream 1350 may contain other parameters and information in practical applications.

In an embodiment, the SEI message 1372 may be a serial digital interface (SDI) SEI message. The SDI SEI message may be used to indicate which primary layers are associated with an auxiliary layer when auxiliary information is present in a bitstream. For example, the SDI SEI message may include one or more syntax elements 1374 to indicate which primary layers are associated with the auxiliary layer when the auxiliary information is present in the bitstream. A discussion of various SEI messages and the syntax elements included in those SEI messages is provided below.

To solve the above problems, methods as summarized below are disclosed. The techniques should be considered as examples to explain the general concepts and should not be interpreted in a narrow way. Furthermore, these techniques can be applied individually or combined in any manner.

Inference is discussed. During the inference stage, the distorted reconstruction frames are fed into CNN and processed by the CNN model whose parameters are already determined in the training stage. The input samples to the CNN can be reconstructed samples before or after DB, or reconstructed samples before or after SAO, or reconstructed samples before or after ALF.

The current CNN-based loop filtering has the following problems. The CNN-based filtering is applied in the coding loop, ignoring the processing capabilities of the decoder.

Disclosed herein are techniques that solve one or more of the foregoing problems. For example, the present disclosure provides one or more neural network (NN) filter models trained as part of an in-loop filtering technology or filtering technology used in a post-processing stage for reducing the distortion incurred during compression. In addition, samples with different characteristics are processed by different NN filter models. The present disclosure also elaborates how to design multiple NN filter models, how to select from multiple NN filter models and how to signal the selected NN filter index.

Video coding is a lossy process. Convolutional Neural Networks (CNN) can be trained to recover detail lost in the compression process. That is, artificial intelligence (AI) processes can create CNN filters based on training data.

Different CNN filter models work best for different situations. The encoder and the decoder have access to a plurality of NN filter models, such as CNN filter models, that have been trained ahead of time (a.k.a., pre-trained). The present disclosure describes methods and techniques to allow the encoder to signal to the decoder which NN filter model to use for each video unit. The video unit may be a sequence of pictures, a picture, a slice, a tile, a brick, a sub-picture, a coding tree unit (CTU), a CTU row, a coding unit (CU), etc. As an example, different NN filters can be used for different layers, different components (e.g., luma, chroma, and Cb and Cr components, etc.), different specific video units, etc. Flags and/or indices can be signaled via one or more rules to indicate which NN filter model should be used for each video item. The NN filter models can be signaled based on a reconstructed quality level of the video unit. The reconstructed quality level of the video unit is a coding unit indicative of a quality of the video unit. For example, the reconstructed quality level of the video unit may refer to one or more of a QP, a bitrate, a constant rate factor value, and other metrics.

Inheritance of NN filters between parent and child nodes when trees are used to partition video units is also provided.

The listing of embodiments below should be considered as examples to explain general concepts. These embodiments should not be interpreted in a narrow way. Furthermore, these embodiments can be combined in any manner.

In the disclosure, an NN filter can be any kind of NN filter, such as a convolutional neural network (CNN) filter. In the following discussion, an NN filter may also be referred to as a CNN filter.

In the following discussion, a video unit may be a sequence, a picture, a slice, a tile, a brick, a subpicture, a CTU/CTB, a CTU/CTB row, one or multiple CUs/coding blocks (CBs), one or multiple CTUs/CTBs, one or multiple Virtual Pipeline Data Unit (VPDU), or a sub-region within a picture/slice/tile/brick. A father video unit represents a unit larger than the video unit. Typically, a father video unit will contain several video units, for example, when the video unit is a CTU, the father video unit could be slice, CTU row, multiple CTUs, etc. In some embodiments, the video unit may be a sample/pixel.

A discussion of the model selection is provided.

EXAMPLE 1

1. In a first embodiment, for a different reconstructed quality level (e.g., QP, bitrate, Constant Rate Factor (CRF) value), different CNN filter model candidates may be used. CRF refers to the default quality and rate control setting for the x264 and x265 open source encoders. The default setting or CRF is 23 (settable at values ranging between 0 and 51) for x264 encoders and 28 for x265 encoders.

a. In one example, for each reconstructed quality level, pretrained CNN filter model candidates are used.

b. In one example, video quality level is inferred from the quantization parameter (QP).

i. In one example, denote the QP of current video unit as q, and K (e.g., K=3) sets of CNN filter models are trained corresponding to $q_1, q_2, \ldots q_K$ respectively, where $qz_1, q_2, \ldots q_K$ are three different QPs around q. The current video unit will be processed by one of K sets.

1) In one example, at least one of the $q_1, q_2, \ldots q_K$ is smaller than q.

2) In one example, at least one of the $q_1, q_2, \ldots q_K$ is greater than q.

3) In one example, selection of the one of K sets may be determined by q and $\{q_1, q_2, \ldots q_K\}$.

a. In one example, the set corresponding to q_i which gives the smallest differences with q will be chosen.

4) Alternatively, more than one set may be allowed to process the current video unit.

a. In one example, filter models from the more than one set may be allowed to be selected and indicators of the index to the more than one sets may be signaled.

b. In one example, an indicator of a selected set index corresponding to the more than one set may be signaled.

i. Alternatively, furthermore, the indictor of a filter model index within the selected set index may be further signaled.

1. How to signal or whether to signal the indictor of the filter model index may depend on the number of filter models within the selected set index.

c. In the above example, the QP value may be replaced by other quality level metrics (e.g., the CRF value, bitrate).

d. In one example, the selection of NN filtering model may depend on a combination of quality level (e.g., QP, bitrate, Constant rate factor (CRF) value) and at least a second coding feature.

i. The second coding feature may comprise: temporal layer, slice or picture type, coding mode, picture or subpicture dimensions (resolution), etc.

2. Multiple CNN filter model candidates may have different structures.

a. In one example, different CNN filter model candidates may be with different network-sizes.

i. In one example, the network-sizes are controlled by the number of layers.

ii. In one example, the network-sizes are controlled by the number of feature maps.

iii. In one example, the network-sizes are controlled by the resolution of intermediate feature maps.

iv. In one example, the network-sizes are controlled by a combination of features presented in last three bullets.

EXAMPLE 2

3. In a second embodiment, a same index signaled in a bitstream or an SEI message may be determined to be associated with a different NN filter model for two video units.

a. In one example, at least one of the NN filter model in candidate lists for the two video units is different.

b. In one example, the NN filter model candidate lists for the two video units may be the same. However, the determination process may be dependent on the coding characteristics of the video units.

i. In one example, it may be dependent on the prediction mode distributions.

ii. In one example, it may be dependent on the gradient/Laplacian activities of the two video units.

4. The group of NN filter model candidates may be the same or different for video units across different temporal layers.

a. In one example, for video units in different temporal layers, the group of NN filter model candidates may be the same.

b. In one example, an individual group of NN filter model candidates is used for each temporal layer.

i. In one example, for video units in higher temporal layers, the filter group contains models with smaller size.

1) A smaller size means less feature maps, or feature maps with lower resolution, or shallower networks.

c. In one example, temporal layers are grouped into several subgroups. For each subgroup, an individual group of NN filter model candidates is used.

i. In one example, for the subgroup containing low temporal layers (e.g., with temporal layer index no greater than K1), one of the candidates is the NN filter model corresponding to the intra-slice if the ratio of intra-coded samples is no smaller than or greater than a threshold in the video unit.

1) In one example, the threshold may be pre-defined.

2) Alternatively, it may be derived on-the-fly, e.g., according to decoded information, or sequence, picture or slice level QP.

3) Alternatively, it may be derived on-the-fly, e.g., according to color component.

ii. In one example, for the subgroup containing high temporal layers(e.g., with temporal layer index greater than K2), one of the candidates is the NN filter model corresponding to a larger QP (e.g q+5, where q is the base QP used for the sequence that the video unit belongs to).

iii. In one example, K1 is set to 3.

iv. In one example, K2 is set to 3.

EXAMPLE 3

5. In a third embodiment, the syntax elements of NN filter related aspects may be coded before ALF parameters.

a. In one example, the syntax elements may be signalled in CTU level, e.g., right before the ALF parameters.

b. In one example, the syntax elements may be signalled in CTU level, e.g., right before SAO parameters.

6. The syntax elements of NN filter related aspects may be coded in an SEI message.

7. The indication of other in-loop filters (e.g., deblocking filter, SAO, ALF, CCALF, Bilateral filter) may be dependent on whether and/or how the NN filter is applied (e.g., the filter model index).

a. In one example, the signaling of indications of the other in-loop filters may be conditionally signaled according to whether and/or how the NN filter is applied.

b. In one example, whether and/or how the other in-loop filters is applied may depend on whether and/or how the NN filter is applied.

c. In one example, if the NN filter is applied to one block, CCALF is disabled without being signaled.

EXAMPLE 4

An embodiment of applying NN-based filtering methods is discussed. An exemplary SEI message syntax is provided below.

|  | Descriptor |
|---|---|
| post_cnn_filter ( payloadSize ) { |  |
|   luma_parameters_present_flag | u(1) |
|   cb_parameters_present_flag | u(1) |
|   cr_parameters_present_flag | u(1) |
|   if( luma_parameters_present flag) { |  |
|     luma_con_filter_slice_indication |  |
|     luma_inference_block_size = derive_luma_inference_block_size(slice_qp, pic_width_in_luma_samples) | u(3) |
|     luma_num_block_rows = (pic_width_in_luma_samples + luma_inference_block_size >> 1) / luma_inference_block_size |  |
|     luma_num_block_columns = (pic_height_in_luma_samples + luma_inference_block_size >> 1) / luma_inference_block_size |  |
|   } |  |
|   if( cb_parameters_present_flag) { |  |
|     cb_con_filter_slice_indication | u(3) |
|     cb_inference_block_size = derive_cb_inference_block_size(slice_qp, pic_width_in_luma_samples) |  |
|     cb_num_block_rows = (pic_width _in_cb_samples + cb_inference_block_size >> 1) / cb_inference_block_size |  |
|     cb_num_block_columns = (pic_height_in_cb_samples + cb_inference_block_size >> 1) / cb_inference_block_size |  |
|   } |  |
|   if( cr_parameters_present flag) { |  |
|     cr_con_filter_slice_indication | u(3) |
|     cb_inference_block_size = derive_cr_inference_block_size(slice qp, pic_width_in_luma_samples) |  |
|     cr_num_block_rows = (pic_width_in_cr_samples + cr_inference_block_size >> 1) / cr_inference_block_size |  |
|     cr_num_block_columns = (pic_height_in_cr_samples + cr_inference_block_size >> 1) / cr_inference_block_size |  |
|   } |  |
|   if( luma_parameters_present_flag) { |  |
|     for( i = 0; i < luma_num_block_rows; i++) |  |
|       for( j = 0; j < luma_num_block_columns; j++) { |  |
|         If (luma_cnn_filter_slice_indication < 4) |  |
|           luma_cnn_block_idc[i][j] = luma_cnn_filter_slice_indication |  |
|         else |  |
|           luma_con_block_idc[i][j] | u(2) |
|       } |  |
|   } |  |
|   if( cb_parameters_present flag) { |  |
|     for( i = 0; i < cb_num_block_rows; i++) |  |
|       for( j = 0; j < cb_num_block_columns; j++) { |  |
|         If (cb)_cnn_filter_slice_indication < 4) |  |
|           cb cnn_block_idc[i][j] =cb_cnn_filter_slice_indication |  |
|         else |  |
|           cb_cnn_block_idc[i][j] | u(2) |
|       } |  |
|   } |  |
|   if( cr_parameters_present flag ) { |  |
|     for( i = 0; i < cr_num_block_rows; i++) |  |
|       for( j = 0; j < cr_num_block_columns; j++) { |  |
|         If (cr_cnn_filter_slice_indication < 4) |  |
|           cr_cnn_block idc[i][j] = cr_cnn_filter_slice_indication |  |
|         else |  |
|           cr_cnn_block_idc[i][j] | u(2) |
|       } |  |
|   } |  |
| } |  | luma_parameters_present_flag equal to 1 indicates that luma CNN parameters will be present. luma_parameters_present_flag equal to 0 indicates that luma CNN parameters will not be present.

cb_parameters_present_flag equal to 1 indicates that Cb CNN parameters will be present. cb_parameters_present_flag equal to 0 indicates that Cb CNN parameters will not be present.

cr_parameters_present_flag equal to 1 indicates that Cr CNN parameters will be present. cr_parameters_present_flag equal to 0 indicates that Cr CNN parameters will not be present.

luma_cnn_filter_slice_indication equal to 0 indicates that the luma CNN filter will not be used for the luma component of any blocks in the slice. luma_cnn_filter_slice_indication equal to i (i=1, 2, or 3) indicates that the i-th luma CNN filter will be used for the luma component of all blocks in the slice. luma_cnn_filter_slice_indication equal to 4 indicates that the luma cnn block idc will be parsed for each block in the slice.

cb_cnn_filter_slice_indication equal to 0 indicates that the Cb CNN filter will not be used for the Cb component of any blocks in the slice. cb_cnn_filter_slice_indication equal to i (i=1, 2, or 3) indicates that the i-th Cb CNN filter will be used for the Cb component of all blocks in the slice. cb_cnn_filter_slice_ indication equal to 4 indicates that the cb_cnn_block_idc will be parsed for each block in the slice.

cr_cnn_filter_slice_indication equal to 0 indicates that the Cr CNN filter will not be used for the Cr compoent of any blocks in the slice. cr_cnn_filter_slice_ indication equal to i (i=1, 2, or 3) indicates that the i-th Cr CNN filter will be used for the Cr component of all blocks in the slice. cr_cnn_filter_slice_indication equal to 4 indicates that the cr_cnn_block_idc will be parsed for each block in the slice.

luma_cnn_block_idc[i][j] equal to 0 indicates that the luma CNN filter will not be used for the luma component of this block. luma_cnn_block_idc[i][j] equal to i (i=1, 2, or 3) indicates that the i-th luma CNN filter will be used for the luma component of this block.

cb_cnn_block_idc[i][j] equal to 0 indicates that the Cb CNN filter will not be used for the Cb component of this block. cr_cnn_block_idc[i][j] equal to i (i=1, 2, or 3) indicates that the i-th cb cnn filter will be used for the Cb component of this block.

cr_cnn_block_idc[i] [j] equal to 0 indicates that the Cr CNN filter will not be used for the Cr component of this block. cr_cnn_block_idc[i][j] equal to i (i=1, 2, or 3) indicates that the i-th Cr CNN filter will be used for the Cr component of this block.

Figure 15:
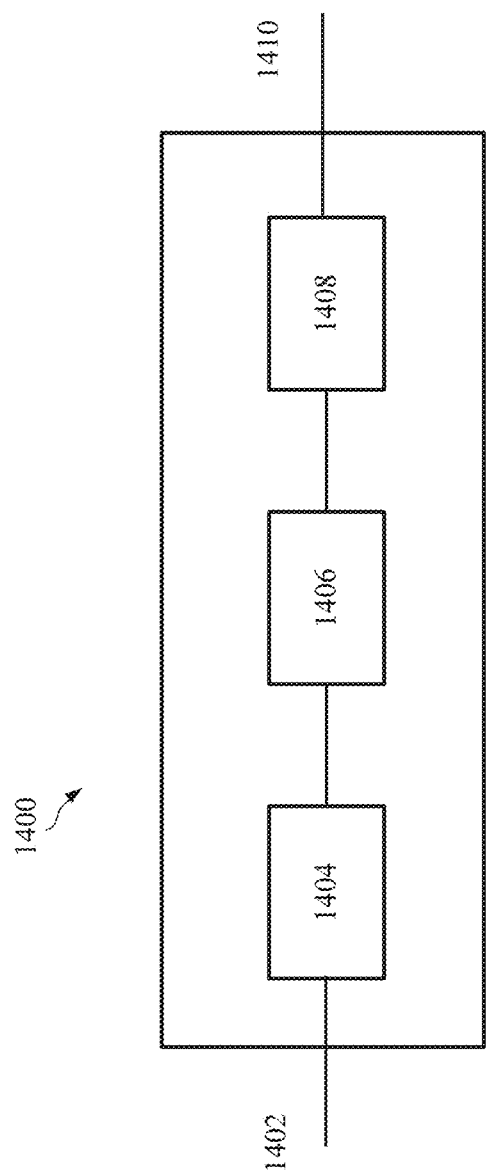
FIG. 15 is a block diagram showing an example of a video processing system.

FIG. 15 is a block diagram showing an example of a video processing system 1400 in which various techniques disclosed herein may be implemented. Various implementations may include some or all of the components of the video processing system 1400. The video processing system 1400 may include input 1402 for receiving video content. The video content may be received in a raw or uncompressed format, e.g., 8 or 10bit multi-component pixel values, or may be in a compressed or encoded format. The input 1402 may represent a network interface, a peripheral bus interface, or a storage interface. Examples of a network interface include wired interfaces such as Ethernet, passive optical network (PON), etc. and wireless interfaces such as Wireless Fidelity (Wi-Fi) or cellular interfaces.

The video processing system 1400 may include a coding component 1404 that may implement the various coding or encoding methods described in the present document. The coding component 1404 may reduce the average bitrate of video from the input 1402 to the output of the coding component 1404 to produce a coded representation of the video. The coding techniques are therefore sometimes called video compression or video transcoding techniques. The output of the coding component 1404 may be either stored, or transmitted via a connected communication, as represented by the component 1406. The stored or communicated bitstream (or coded) representation of the video received at the input 1402 may be used by the component 1408 for generating pixel values or displayable video that is sent to a display interface 1410. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include a universal serial bus (USB), high definition multimedia interface (HDMI), Displayport, and so on. Examples of storage interfaces include SATA (serial advanced technology attachment), Peripheral Component Interconnect (PCI), Integrated Drive Electronics (IDE) interface, and the like. The techniques described in the present document may be embodied in various electronic devices such as mobile phones, laptops, smartphones or other devices that are capable of performing digital data processing and/or video display.

Figure 16:
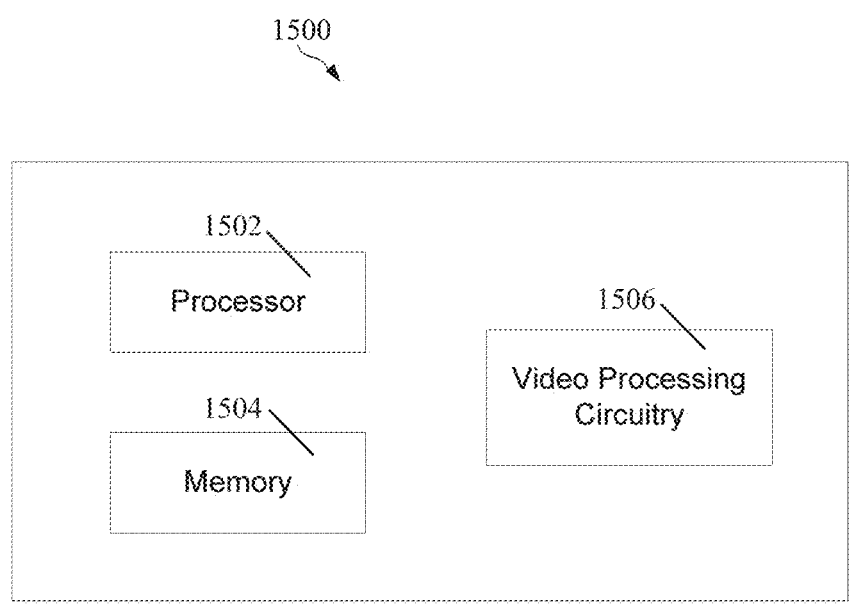
FIG. 16 is a block diagram of a video processing apparatus.

FIG. 16 is a block diagram of a video processing apparatus 1500. The apparatus 1500 may be used to implement one or more of the methods described herein. The apparatus 1500 may be embodied in a smartphone, tablet, computer, Internet of Things (IoT) receiver, and so on. The apparatus 1500 may include one or more processors 1502, one or more memories 1504 and video processing hardware 1506 (a.k.a., video processing circuitry). The processor(s) 1502 may be configured to implement one or more methods described in the present document. The memory (memories) 1504 may be used for storing data and code used for implementing the methods and techniques described herein. The video processing hardware 1506 may be used to implement, in hardware circuitry, some techniques described in the present document. In some embodiments, the hardware 1506 may be partly or completely located within the processor 1502, e.g., a graphics processor.

Figure 17:
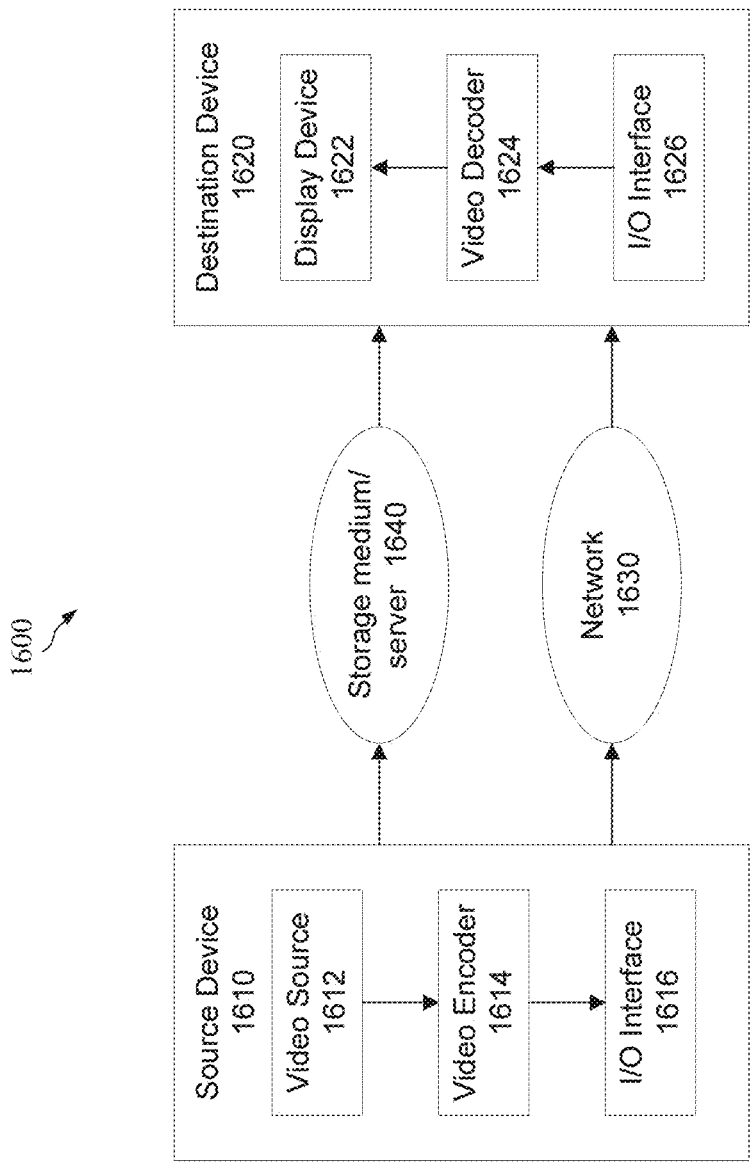
FIG. 17 is a block diagram that illustrates an example of a video coding system.

FIG. 17 is a block diagram that illustrates an example of a video coding system 1600 that may utilize the techniques of this disclosure. As shown in FIG. 17, the video coding system 1600 may include a source device 1610 and a destination device 1620. Source device 1610 generates encoded video data and may be referred to as a video encoding device. Destination device 1620 may decode the encoded video data generated by source device 1610 and may be referred to as a video decoding device.

Source device 1610 may include a video source 1612, a video encoder 1614, and an input/output (I/O) interface 1616.

Video source 1612 may include a source such as a video capture device, an interface to receive video data from a video content provider, and/or a computer graphics system for generating video data, or a combination of such sources. The video data may comprise one or more pictures. Video encoder 1614 encodes the video data from video source 1612 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 1616 may include a modulator/demodulator (modem) and/or a transmitter. The encoded video data may be transmitted directly to destination device 1620 via I/O interface 1616 through network 1630. The encoded video data may also be stored onto a storage medium/server 1640 for access by destination device 1620.

Destination device 1620 may include an I/O interface 1626, a video decoder 1624, and a display device 1622.

I/O interface 1626 may include a receiver and/or a modem. I/O interface 1626 may acquire encoded video data from the source device 1610 or the storage medium/server 1640. Video decoder 1624 may decode the encoded video data. Display device 1622 may display the decoded video data to a user. Display device 1622 may be integrated with the destination device 1620, or may be external to destination device 1620 which may be configured to interface with an external display device.

Video encoder 1614 and video decoder 1624 may operate according to a video compression standard, such as the High Efficiency Video Coding (HEVC) standard, Versatile Video Coding (VVC) standard, and other current and/or further standards.

Figure 18:
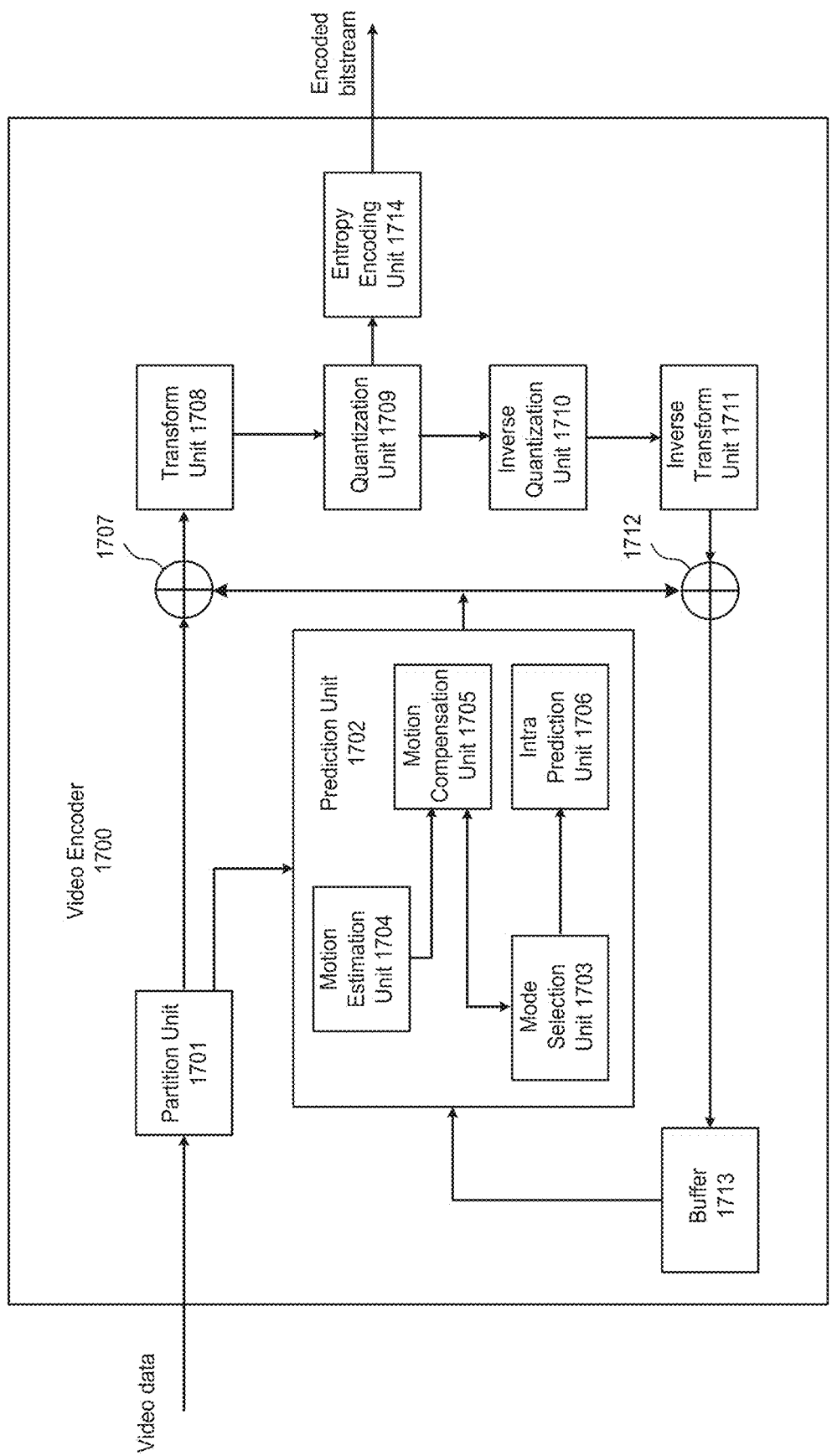
FIG. 18 is a block diagram illustrating an example of a video encoder.

FIG. 18 is a block diagram illustrating an example of a video encoder 1700, which may be video encoder 1614 in the video coding system 1600 illustrated in FIG. 17.

Video encoder 1700 may be configured to perform any or all of the techniques of this disclosure. In the example of FIG. 18 video encoder 1700 includes a plurality of functional components. The techniques described in this disclosure may be shared among the various components of video encoder 1700. In some examples, a processor may be configured to perform any or all of the techniques described in this disclosure.

The functional components of video encoder 1700 may include a partition unit 1701, a prediction unit 1702 which may include a mode selection unit 1703, a motion estimation unit 1704, a motion compensation unit 1705 and an intra prediction unit 1706, a residual generation unit 1707, a transform unit 1708, a quantization unit 1709, an inverse quantization unit 1710, an inverse transform unit 1711, a reconstruction unit 1712, a buffer 1713, and an entropy encoding unit 1714.

In other examples, video encoder 1700 may include more, fewer, or different functional components. In an example, prediction unit 1702 may include an intra block copy (IBC) unit. The IBC unit may perform prediction in an IBC mode in which at least one reference picture is a picture where the current video block is located.

Furthermore, some components, such as motion estimation unit 1704 and motion compensation unit 1705 may be highly integrated, but are represented in the example of FIG. 18 separately for purposes of explanation.

Partition unit 1701 may partition a picture into one or more video blocks. Video encoder 1614 and video decoder 1624 of FIG. 17 may support various video block sizes.

Mode selection unit 1703 may select one of the coding modes, intra or inter, e.g., based on error results, and provide the resulting intra- or inter-coded block to a residual generation unit 1707 to generate residual block data and to a reconstruction unit 1712 to reconstruct the encoded block for use as a reference picture. In some examples, mode selection unit 1703 may select a combination of intra and inter prediction (CIIP) modes in which the prediction is based on an inter prediction signal and an intra prediction signal. Mode selection unit 1703 may also select a resolution for a motion vector (e.g., a sub-pixel or integer pixel precision) for the encoded block in the case of inter-prediction.

To perform inter prediction on a current video block, motion estimation unit 1704 may generate motion information for the current video block by comparing one or more reference frames from buffer 1713 to the current video block. Motion compensation unit 1705 may determine a predicted video block for the current video block based on the motion information and decoded samples of pictures from buffer 1713 other than the picture associated with the current video block.

Motion estimation unit 1704 and motion compensation unit 1705 may perform different operations for a current video block, for example, depending on whether the current video block is in an I slice, a P slice, or a B slice. I-slices (or I-frames) are the least compressible but don't require other video frames to decode. S-slices (or P-frames) can use data from previous frames to decompress and are more compressible than I-frames. B-slices (or B-frames) can use both previous and forward frames for data reference to get the highest amount of data compression.

In some examples, motion estimation unit 1704 may perform uni-directional prediction for the current video block, and motion estimation unit 1704 may search reference pictures of list 0 or list 1 for a reference video block for the current video block. Motion estimation unit 1704 may then generate a reference index that indicates the reference picture in list 0 or list 1 that contains the reference video block and a motion vector that indicates a spatial displacement between the current video block and the reference video block. Motion estimation unit 1704 may output the reference index, a prediction direction indicator, and the motion vector as the motion information of the current video block. Motion compensation unit 1705 may generate the predicted video block of the current block based on the reference video block indicated by the motion information of the current video block.

In other examples, motion estimation unit 1704 may perform bi-directional prediction for the current video block, motion estimation unit 1704 may search the reference pictures in list 0 for a reference video block for the current video block and may also search the reference pictures in list 1 for another reference video block for the current video block. Motion estimation unit 1704 may then generate reference indexes that indicate the reference pictures in list 0 and list 1 containing the reference video blocks and motion vectors that indicate spatial displacements between the reference video blocks and the current video block. Motion estimation unit 1704 may output the reference indexes and the motion vectors of the current video block as the motion information of the current video block. Motion compensation unit 1705 may generate the predicted video block of the current video block based on the reference video blocks indicated by the motion information of the current video block.

In some examples, motion estimation unit 1704 may output a full set of motion information for decoding processing of a decoder.

In some examples, motion estimation unit 1704 may not output a full set of motion information for the current video. Rather, motion estimation unit 1704 may signal the motion information of the current video block with reference to the motion information of another video block. For example, motion estimation unit 1704 may determine that the motion information of the current video block is sufficiently similar to the motion information of a neighboring video block.

In one example, motion estimation unit 1704 may indicate, in a syntax structure associated with the current video block, a value that indicates to the video decoder 1624 that the current video block has the same motion information as another video block.

In another example, motion estimation unit 1704 may identify, in a syntax structure associated with the current video block, another video block and a motion vector difference (MVD). The motion vector difference indicates a difference between the motion vector of the current video block and the motion vector of the indicated video block. The video decoder 1624 may use the motion vector of the indicated video block and the motion vector difference to determine the motion vector of the current video block.

As discussed above, video encoder 1614 may predictively signal the motion vector. Two examples of predictive signaling techniques that may be implemented by video encoder 1614 include advanced motion vector prediction (AMVP) and merge mode signaling.

Intra prediction unit 1706 may perform intra prediction on the current video block. When intra prediction unit 1706 performs intra prediction on the current video block, intra prediction unit 1706 may generate prediction data for the current video block based on decoded samples of other video blocks in the same picture. The prediction data for the current video block may include a predicted video block and various syntax elements.

Residual generation unit 1707 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block, for example in a skip mode, and residual generation unit 1707 may not perform the subtracting operation.

Transform unit 1708 may generate one or more transform coefficient video blocks for the current video block by applying one or more transforms to a residual video block associated with the current video block.

After transform unit 1708 generates a transform coefficient video block associated with the current video block, quantization unit 1709 may quantize the transform coefficient video block associated with the current video block based on one or more quantization parameter (QP) values associated with the current video block.

Inverse quantization unit 1710 and inverse transform unit 1711 may apply inverse quantization and inverse transforms to the transform coefficient video block, respectively, to reconstruct a residual video block from the transform coefficient video block. Reconstruction unit 1712 may add the reconstructed residual video block to corresponding samples from one or more predicted video blocks generated by the prediction unit 1702 to produce a reconstructed video block associated with the current block for storage in the buffer 1713.

After reconstruction unit 1712 reconstructs the video block, loop filtering operation may be performed to reduce video blocking artifacts in the video block.

Entropy encoding unit 1714 may receive data from other functional components of the video encoder 1700. When entropy encoding unit 1714 receives the data, entropy encoding unit 1714 may perform one or more entropy encoding operations to generate entropy encoded data and output a bitstream that includes the entropy encoded data.

Figure 19:
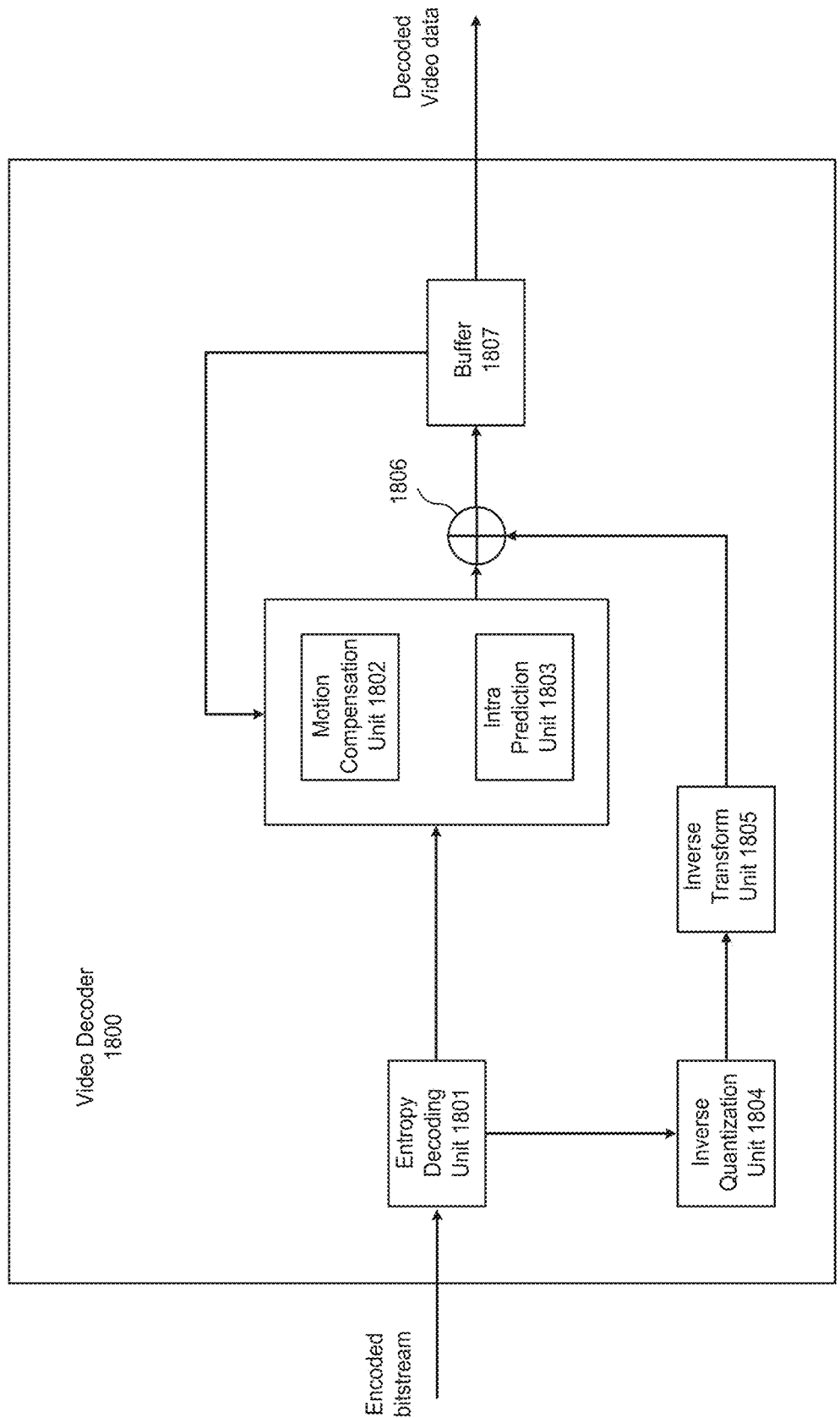
FIG. 19 is a block diagram illustrating an example of a video decoder.

FIG. 19 is a block diagram illustrating an example of a video decoder 1800, which may be video decoder 1624 in the video coding system 1600 illustrated in FIG. 17.

The video decoder 1800 may be configured to perform any or all of the techniques of this disclosure. In the example of FIG. 19, the video decoder 1800 includes a plurality of functional components. The techniques described in this disclosure may be shared among the various components of the video decoder 1800. In some examples, a processor may be configured to perform any or all of the techniques described in this disclosure.

In the example of FIG. 19, video decoder 1800 includes an entropy decoding unit 1801, a motion compensation unit 1802, an intra prediction unit 1803, an inverse quantization unit 1804, an inverse transformation unit 1805, and a reconstruction unit 1806 and a buffer 1807. Video decoder 1800 may, in some examples, perform a decoding pass generally reciprocal to the encoding pass described with respect to video encoder 1614 (FIG. 17).

Entropy decoding unit 1801 may retrieve an encoded bitstream. The encoded bitstream may include entropy coded video data (e.g., encoded blocks of video data). Entropy decoding unit 1801 may decode the entropy coded video data, and from the entropy decoded video data, motion compensation unit 1802 may determine motion information including motion vectors, motion vector precision, reference picture list indexes, and other motion information. Motion compensation unit 1802 may, for example, determine such information by performing the AMVP and merge mode signaling.

Motion compensation unit 1802 may produce motion compensated blocks, possibly performing interpolation based on interpolation filters. Identifiers for interpolation filters to be used with sub-pixel precision may be included in the syntax elements.

Motion compensation unit 1802 may use interpolation filters as used by video encoder 1614 during encoding of the video block to calculate interpolated values for sub-integer pixels of a reference block. Motion compensation unit 1802 may determine the interpolation filters used by video encoder 1614 according to received syntax information and use the interpolation filters to produce predictive blocks.

Motion compensation unit 1802 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 1803 may use intra prediction modes, for example, received in the bitstream to form a prediction block from spatially adjacent blocks. Inverse quantization unit 1804 inverse quantizes, i.e., de-quantizes, the quantized video block coefficients provided in the bitstream and decoded by entropy decoding unit 1801. Inverse transform unit 1805 applies an inverse transform.

Reconstruction unit 1806 may sum the residual blocks with the corresponding prediction blocks generated by motion compensation unit 1802 or intra-prediction unit 1803 to form decoded blocks. If desired, a deblocking filter may also be applied to filter the decoded blocks in order to remove blockiness artifacts. The decoded video blocks are then stored in buffer 1807, which provides reference blocks for subsequent motion compensation/intra prediction and also produces decoded video for presentation on a display device.

Figure 20:
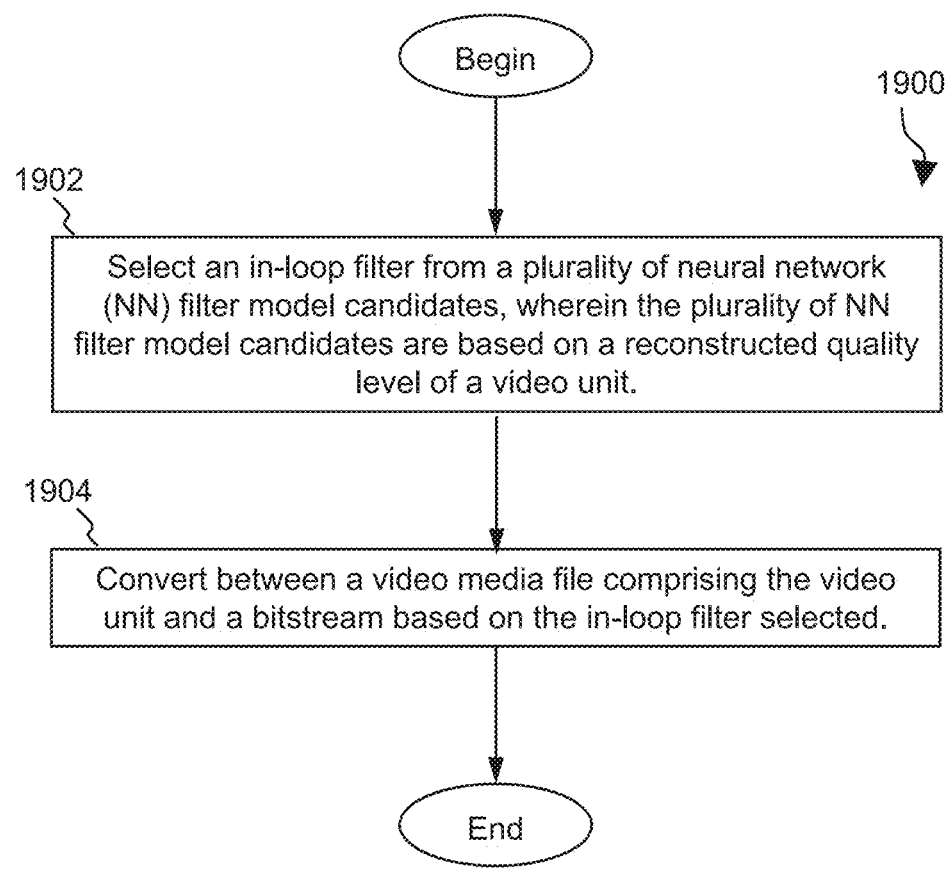
FIG. 20 is a method for coding video data according to an embodiment of the disclosure.

FIG. 20 is a method 1900 of processing video data according to an embodiment of the disclosure. The method 1900 may be performed by a coding apparatus (e.g., an encoder) having a processor and a memory. In block 1902, a coding apparatus selects an in-loop filter from a plurality of neural network (NN) filter model candidates, wherein the plurality of NN filter model candidates are based on a reconstructed quality level of a video unit. In block 1904, the coding apparatus converts between a video media file comprising the video unit and a bitstream based on the in-loop filter selected. When implemented in an encoder, converting includes receiving a media file (e.g., a video unit). When implemented in a decoder, converting includes receiving a bitstream, and decoding the bitstream to obtain the video media file. In an embodiment, the method 1900 may utilize or incorporate one or more of the features or processes of the other methods disclosed herein.

In an embodiment, an apparatus for coding video data comprising a processor and a non-transitory memory with instructions thereon, wherein the instructions upon execution by the processor cause the processor to: select an in-loop filter from a plurality of neural network (NN) filter model candidates, wherein the plurality of NN filter model candidates are based on a reconstructed quality level of a video unit, and convert between a video media file comprising the video unit and a bitstream based on the in-loop filter selected.

In an embodiment, a non-transitory computer readable medium comprising a computer program product for use by a coding apparatus, the computer program product comprising computer executable instructions stored on the non-transitory computer readable medium that, when executed by one or more processors, cause the coding apparatus to: select an in-loop filter from a plurality of neural network (NN) filter model candidates, wherein the plurality of NN filter model candidates are based on a reconstructed quality level of a video unit, and convert between a video media file comprising the video unit and a bitstream based on the in-loop filter selected.

Figure 21:
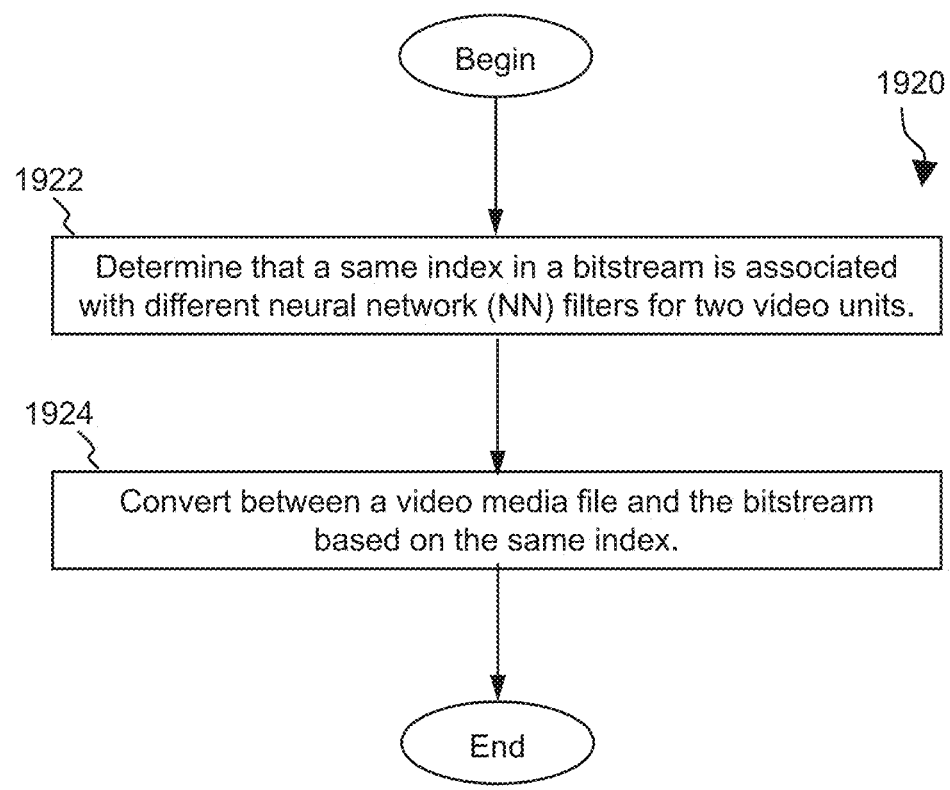
FIG. 21 is another method for coding video data according to an embodiment of the disclosure.

FIG. 21 is another method 1920 of processing video data according to an embodiment of the disclosure. The method 1920 may be performed by a coding apparatus (e.g., an encoder) having a processor and a memory. In block 1922, a coding apparatus determines that a same index in a bitstream is associated with different neural network (NN) filters for two video units.

In block 1924, the coding apparatus converts between a video media file comprising the video unit and a bitstream based on the same index. When implemented in an encoder, converting includes receiving a media file (e.g., a video unit) and encoding the same index into a bitstream. When implemented in a decoder, converting includes receiving a bitstream including the same index, and decoding the bitstream to obtain the video media file. In an embodiment, the method 1920 may utilize or incorporate one or more of the features or processes of the other methods disclosed herein.

In an embodiment, an apparatus for coding video data comprising a processor and a non-transitory memory with instructions thereon, wherein the instructions upon execution by the processor cause the processor to: determine that a same index in a bitstream is associated with different neural network (NN) filters for two video units, and convert between a video media file and the bitstream based on the same index.

In an embodiment, a non-transitory computer readable medium comprising a computer program product for use by a coding apparatus, the computer program product comprising computer executable instructions stored on the non-transitory computer readable medium that, when executed by one or more processors, cause the coding apparatus to: determine that a same index in a bitstream is associated with different neural network (NN) filters for two video units, and convert between a video media file and the bitstream based on the same index.

Figure 22:
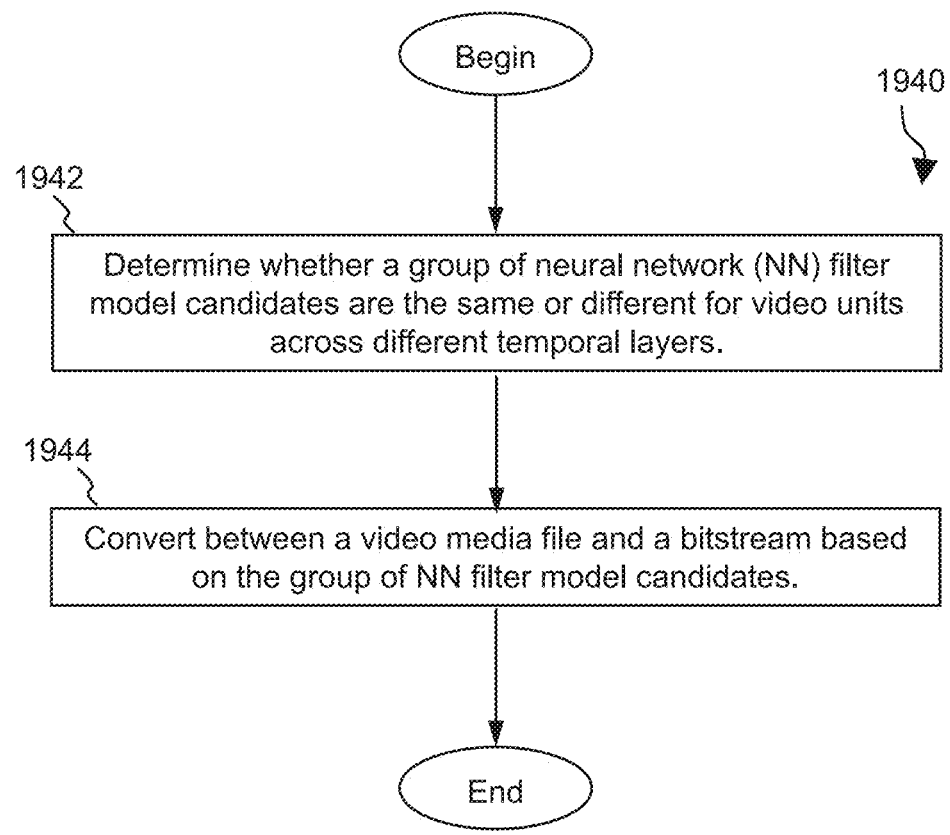
FIG. 22 is another method for coding video data according to an embodiment of the disclosure.

FIG. 22 is another method 1940 of processing video data according to an embodiment of the disclosure. The method 1940 may be performed by a coding apparatus (e.g., an encoder) having a processor and a memory. In block 1942, the coding apparatus determines whether a group of neural network (NN) filter model candidates are the same or different for video units across different temporal layers.

In block 1944, the coding apparatus converts between a video media file comprising the plurality of video layers and a bitstream based on the group of NN filter model candidates. When implemented in an encoder, converting includes receiving a media file (comprising a plurality of video layers) and encoding an identity of the group of NN filter model candidates into a bitstream. When implemented in a decoder, converting includes receiving a bitstream, including the identity of the group of NN filter model candidates, and decoding the bitstream to obtain the video media file. In an embodiment, the method 1940 may utilize or incorporate one or more of the features or processes of the other methods disclosed herein.

In an embodiment, an apparatus for coding video data comprising a processor and a non-transitory memory with instructions thereon, wherein the instructions upon execution by the processor cause the processor to: determine whether a group of neural network (NN) filter model candidates are the same or different for video units across different temporal layers, and convert between a video media file and a bitstream based on the group of NN filter model candidates.

In an embodiment, a non-transitory computer readable medium comprising a computer program product for use by a coding apparatus, the computer program product comprising computer executable instructions stored on the non-transitory computer readable medium that, when executed by one or more processors, cause the coding apparatus to: determine whether a group of neural network (NN) filter model candidates are the same or different for video units across different temporal layers, and convert between a video media file and a bitstream based on the group of NN filter model candidates.

A listing of solutions preferred by some embodiments is provided next.

The following solutions show example embodiments of techniques discussed in the previous section.

1. A method of video processing, comprising: performing a conversion between a video comprising a video unit and a bitstream of the video, wherein the conversion comprises applying an in-loop filter to a reconstructed unit corresponding to the video unit, wherein the in-loop filter is selected based on one or more computational neural network (CNN) models; wherein a rule defines that whether or how the one or more CNN models are selected is responsive to a quality level of the reconstructed unit.

2. The method of solution 1, wherein a different CNN model is associated with each of the quality level.

3. The method of solutions 1-2, wherein the quality level is responsive to a quantization parameter (QP) of the reconstructed unit.

4. The method of solutions 1-2, wherein the quality level is responsive to a constant rate factor or a bitrate of the reconstructed unit.

5. The method of any of solutions 1-4, wherein the rule further specifies that the one or more CNN models are further dependent on the quality level and an additional coding characteristic of the reconstructed unit.

The following solutions show example embodiments of techniques discussed in the previous section.

6. The method of any of above solutions, wherein the one or more CNN models include multiple CNN models that have different structures.

7. The method of solution 6, wherein the different structures may comprises different network sizes of the neural network.

8. The method of solutions 6-7, wherein the network sizes are dependent by a resolution of intermediate feature maps of the video.

The following solutions show example embodiments of techniques discussed in the previous section.

9. A method of video processing, comprising: performing a conversion between a video and a bitstream of the video according to a rule, wherein an in-loop filtering operation is performed during the conversion, wherein the in-loop filtering operation uses one or more neural network (NN) filters; wherein the rule specifies that an index is included in the bitstream or a supplemental enhancement information (SEI) message such that an NN filter model identified by the index is based on a coding condition of a video unit for which the index is used.

10. The method of solution 9, wherein the rule specifies at least two different candidate NN filter models for two different video units.

11. The method of solutions 9-10, wherein the rule specifies two use a same candidate list of NN filter models for different units, and the rule further specifies how the NN filter model is selected from the same candidate list of NN filter modes.

The following solutions show example embodiments of techniques discussed in the previous section.

12. A method of video processing, comprising: performing a conversion between a video comprising multiple video layers and a bitstream of the video according to a rule, wherein an in-loop filtering operation is performed during the conversion, wherein the in-loop filtering operation uses one or more neural network (NN) filters; wherein the rule specifies a relationship between NN filter models used for the in-loop filtering operation across different layers of the multiple video layers.

13. The method of solution 12, wherein the rule specifies to use a same group of NN filter model candidates across the multiple video layers.

14. The method of solution 12, wherein the rule specifies to use different groups of NN filter model candidates across the multiple video layers.

15. The method of solution 12, wherein the multiple video layers are grouped into subgroups and wherein the rule specifies a group of NN filter model candidates for each subgroup.

16. The method of solution 15, wherein the rule specifies that, for a first subgroup comprising low temporal layers having temporal index no greater than K1, a first candidate NN filter model is specified based on a number of intra coded samples.

17. The method of solution 16, wherein the rule specifies that, for a second subgroup comprising high temporal layers having temporal index no less than K2, a second candidate NN filter model is specified based on a quantization parameter.

The following solutions show example embodiments of techniques discussed in the previous section.

18. The method of any of solutions 1-17, wherein the rule specifies that syntax elements related to NN filter models are included in the bitstream prior to adaptive loop filtering parameters.

19. The method of any of solutions 1-17, wherein the rule specifies that syntax elements related to NN filter models are included in the supplemental enhancement information.

The following solutions show example embodiments of techniques discussed in the previous section.

20. A method of video processing, comprising: performing a conversion between a video comprising one or more video units and a bitstream of the video according to a rule, wherein the conversion comprises applying a neural network (NN) filter and/or another in-loop filter selectively based according to a rule; wherein the rule specifies whether or how the another in-loop filter is applied responsive to whether or how the NN filter is applied.

21. The method of solution 20, wherein the rule further specifies that a syntax element indicative of the another loop-filter is selectively included in the bitstream or a supplemental enhancement information (SEI) message depending on whether a syntax element indicative of the NN filter is includes in the bitstream of the SEI message.

22. The method of any of solutions 20-21, wherein the another in-loop filter includes a deblocking filter or a sample adaptive offset filter or an adaptive loop filter or a cross-component adaptive loop filter or a bilateral filter.

23. The method of any of solutions 1-22, wherein the video unit comprises a coding unit, a transform unit, a prediction unit, a slice or a subpicture.

24. The method of any of solutions 1-22, wherein the video unit is a coding block or a video slice or a video picture or a video tile or a video subpicture.

25. The method of any of solutions 1-22, wherein the conversion comprises generating the video from the bitstream or generating the bitstream from the video.

26. A video decoding apparatus comprising a processor configured to implement a method recited in one or more of solutions 1 to 25.

27. A video encoding apparatus comprising a processor configured to implement a method recited in one or more of solutions 1 to 25.

28. A computer program product having computer code stored thereon, the code, when executed by a processor, causes the processor to implement a method recited in any of solutions 1 to 25.

29. A computer readable medium having a bitstream stored thereupon, the bitstream being generated by a method recited in any of solutions 1 to 25.

30. A method, an apparatus or a system described in the present document.

The following documents are incorporated by reference in their entirety:

[1] Johannes Bane, Valero Laparra, and Eero P Simoncelli, "End-to-end optimization of nonlinear transform codes for perceptual quality," PCS IEEE (2016), 1-5.

[2] Lucas Theis, Wenzhe Shi, Andrew Cunningham, and Ferenc Huszár, "Lossy image compression with compressive autoencoders," arXiv preprint arXiv: 1703.00395 (2017).

[3] Jiahao Li, Bin Li, Jizheng Xu, Ruiqin Xiong, and Wen Gao, "Fully Connected Network-Based Intra Prediction for Image Coding, "IEEE Transactions on Image Processing" 27, 7 (2018), 3236-3247.

[4] Yuanying Dai, Dong Liu, and Feng Wu, "A convolutional neural network approach for post-processing in HEVC intra coding," MMM. Springer, 28-39.

[5] Rui Song, Dong Liu, Houqiang Li, and Feng Wu, "Neural network-based arithmetic coding of intra prediction modes in HEVC," VCIP IEEE (2017), 1-4.

[6] J. Pfaff, P. Helle, D. Maniry, S. Kaltenstadler, W. Samek, H. Schwarz, D. Marpe, and T. Wiegand, "Neural network based intra prediction for video coding," Applications of Digital Image Processing XLI, Vol. 10752. International Society for Optics and Photonics, 1075213 (2018).

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disk read-only memory (CD ROM) and digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   selecting an in-loop filter from a plurality of neural network (NN) filter model candidates, wherein the plurality of NN filter model candidates are based on a reconstructed quality level of a video unit; and
   performing a conversion between a video media file comprising the video unit and a bitstream based on the in-loop filter selected,
   wherein the method further comprises determining whether a group of NN filter model candidates are the same or different for video units across different temporal layers,
   wherein syntax elements corresponding to the in-loop filter selected are coded in the bitstream before syntax elements corresponding to an adaptive loop filter (ALF), and
   wherein the method further comprises determining that a same index in a bitstream is associated with different NN filters for two video units.

2. The method of claim 1, wherein the one or more NN filter model candidates comprise one or more pretrained convolutional neural network (CNN) filter models.

3. The method of claim 1, wherein each of the plurality of NN filter model candidates corresponds to a different reconstructed quality level of video unit.

4. The method of claim 1, wherein the reconstructed quality level of the video unit corresponds to a quantization parameter (QP) of the video unit or at least one of a constant rate factor and a bitrate of the video unit.

5. The method of claim 1, wherein:
   the in-loop filter selected is one of a plurality of in-loop filters including a second in-loop filter, and wherein application of the second in-loop filter is dependent on whether or how the in-loop filter selected is applied; and
   the plurality of in-loop filters comprise at least one of a deblocking filter, a sample adaptive offset (SAO) filter, an adaptive loop filter (ALF), a cross-component adaptive loop filter (CCALF), and a bilateral filter.

6. The method of claim 1, wherein syntax elements corresponding to the in-loop filter selected are coded in the bitstream at a coding tree unit (CTU) level before syntax elements corresponding to an adaptive loop filter (ALF) or before syntax elements corresponding to a sample adaptive offset (SAO) filter.

7. The method of claim 1, wherein the in-loop filter selected is coded in a supplemental enhancement information (SEI) message of the bitstream.

8. The method of claim 1, wherein the same index is disposed in a supplemental enhancement information (SEI) message in the bitstream.

9. The method of claim 1, wherein the determination of whether the group of NN filter model candidates are the same or different for video units across different temporal layers is specified in a rule included in a supplemental enhancement information (SEI) message of the bitstream.

10. The method of claim 1, wherein a rule included in the bitstream specifies that a first subgroup of the group of NN filter model candidates is to be used in an in-loop filtering operation across a first subgroup of the different temporal layers, and that a second subgroup of the group of NN filter model candidates is to be used in an in-loop filtering operation across a second subgroup of the different temporal layers.

11. The method of claim 10, wherein the first subgroup of the different temporal layers comprises layers having a temporal index of no greater than K1, and wherein at least one of the one or more NN filter model candidates to be used in the in-loop filtering operation across the first subgroup is specified by a rule included in the bitstream based on a number of intra coded samples of the first subgroup.

12. The method of claim 10, wherein a rule included in the bitstream associates the group of NN filter model candidates with both a first temporal layer and a separate second temporal layer of the different temporal layers.

13. The method of claim 10, wherein a rule included in the bitstream associates the group of NN filter model candidates with a specific temporal layer of the different temporal layers.

14. The method of claim 1, wherein the conversion includes encoding the video media file into the bitstream.

15. The method of claim 1, wherein the conversion includes decoding the video media file from the bitstream.

16. An apparatus for coding video data comprising a processor and a non-transitory memory with instructions thereon, wherein the instructions upon execution by the processor cause the processor to:
   select an in-loop filter from a plurality of neural network (NN) filter model candidates, wherein the plurality of NN filter model candidates are based on a reconstructed quality level of a video unit; and
   convert between a video media file comprising the video unit and a bitstream based on the in-loop filter selected,
   wherein the instructions, upon execution by the processor, further cause the processor to determine whether a group of NN filter model candidates are the same or different for video units across different temporal layers,
   wherein syntax elements corresponding to the in-loop filter selected are coded in the bitstream before syntax elements corresponding to an adaptive loop filter (ALF), and
   wherein the processor is further caused to determine that a same index in a bitstream is associated with different neural network (NN) filters for two video units.

17. A method for storing a bitstream of a video, comprising:
   selecting an in-loop filter from a plurality of neural network (NN) filter model candidates, wherein the plurality of NN filter model candidates are based on a reconstructed quality level of a video unit;
   performing a conversion between a video media file comprising the video unit and a bitstream based on the in-loop filter selected; and storing the bitstream in a non-transitory computer-readable recording medium, wherein the method further comprises determining whether a group of NN filter model candidates are the same or different for video units across different temporal layers, wherein syntax elements corresponding to the in-loop filter selected are coded in the bitstream before syntax elements corresponding to an adaptive loop filter (ALF), and wherein the method further comprises determining that a same index in a bitstream is associated with different neural network (NN) filters for two video units.

* * * * *